United States Patent
Hamano et al.

(10) Patent No.: US 7,601,289 B2
(45) Date of Patent: Oct. 13, 2009

(54) TWO-SIDES IN-MOLD DECORATION MOLDING DIE AND METHOD OF MANUFACTURING A MOLDED PRODUCT WITH SUCH MOLDING DIE

(75) Inventors: Koji Hamano, Kyoto (JP); Naoto Toyooka, Kyoto (JP); Haruki Adachi, Amagasaki (JP)

(73) Assignee: Nissha Printing Co., Ltd., Kyoto (JP)

( * ) Notice: Subject to any disclaimer, the term of this patent is extended or adjusted under 35 U.S.C. 154(b) by 347 days.

(21) Appl. No.: 10/589,666

(22) PCT Filed: Feb. 15, 2005

(86) PCT No.: PCT/JP2005/002231

§ 371 (c)(1),
(2), (4) Date: Aug. 16, 2006

(87) PCT Pub. No.: WO2005/077638

PCT Pub. Date: Aug. 25, 2005

(65) Prior Publication Data

US 2007/0120289 A1    May 31, 2007

(30) Foreign Application Priority Data

Feb. 18, 2004    (JP)    ............................. 2004-041374

(51) Int. Cl.
*B29C 45/14* (2006.01)
*B29C 45/18* (2006.01)

(52) U.S. Cl. .................... 264/266; 425/112; 425/126.1; 425/190

(58) Field of Classification Search ............. 425/126.1, 425/85, 112, 190; 264/266, 261
See application file for complete search history.

(56) References Cited

U.S. PATENT DOCUMENTS 5,662,946 A  *  9/1997  Pratt et al. ................... 425/190

FOREIGN PATENT DOCUMENTS

EP    1413417    4/2004

(Continued)

OTHER PUBLICATIONS

Partial machine translation of JP2003-053779A obtained from the JPO website.*

(Continued)

*Primary Examiner*—Joseph S. Del Sole
*Assistant Examiner*—Robert Dye
(74) *Attorney, Agent, or Firm*—Wenderoth, Lind & Ponack, L.L.P.

(57) ABSTRACT

The two-sides in-mold decoration molding die includes a first mold on which the first decoration film is lengthwise movably disposed, and a second mold on which the second decoration film is laterally movably disposed and provided with a sprue and a runner, and a protruding section set higher than a region where the second decoration film passes is provided in a portion surrounding at least the runner, in an area directly confronting the first decoration film when the molds are clamped.

9 Claims, 22 Drawing Sheets

FOREIGN PATENT DOCUMENTS

| | | |
|---|---|---|
| JP | 6-099457 | 4/1994 |
| JP | 6-099458 | 4/1994 |
| JP | 8-025414 | 1/1996 |
| JP | 9-001590 | 1/1997 |
| JP | 2003-053779 | 2/2003 |

OTHER PUBLICATIONS

Partial machine translation of JP08-025414A obtained from the JPO website.*

European Search Report issued Mar. 24, 2009 in the corresponding European Patent Application No. EP 05 71 9133.

* cited by examiner

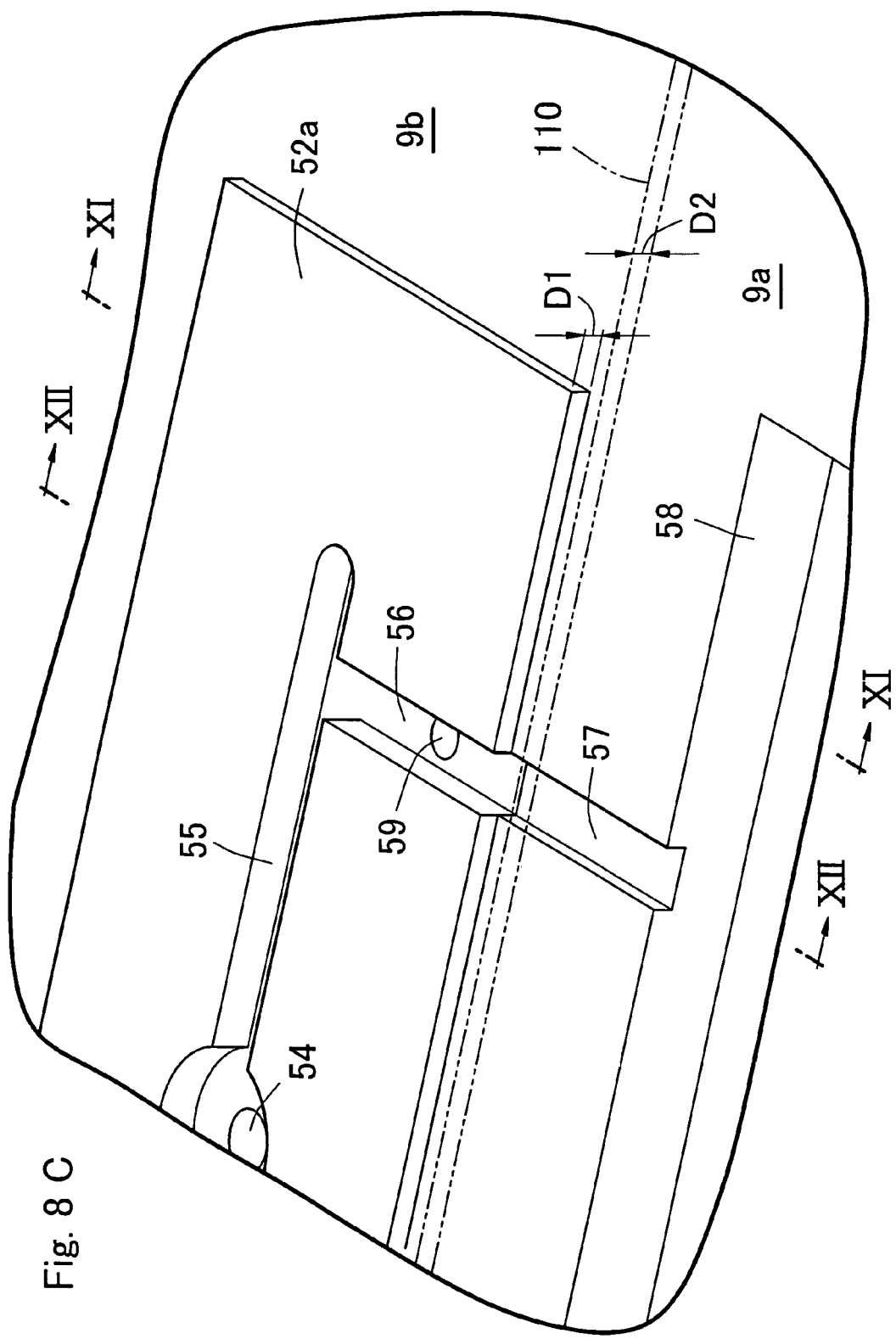

TWO-SIDES IN-MOLD DECORATION MOLDING DIE AND METHOD OF MANUFACTURING A MOLDED PRODUCT WITH SUCH MOLDING DIE

TECHNICAL FIELD

The present invention relates to a two-sides in-mold decoration molding die for manufacturing a resin molded product provided with a decoration on both sides thereof, to be used as a protection panel of a display window for protecting a surface of a display device incorporated in an electronic apparatus, and a method of manufacturing the molded product utilizing such molding die.

BACKGROUND ART

An in-mold decoration (hereinafter simply referred to as "IMD") process includes disposing a decoration film made of a base sheet and a decoration layer provided thereon, between a fixed mold and a movable mold of an IMD molding die, and injecting a molding resin into a molding space defined by clamping the fixed mold and the movable mold, so as to form an injection-molded product and to integrally adhere the decoration layer to a surface of the injection-molded product at a time. Recently, the progress in designing capability and the requirement for higher physical properties from a molten resin surface are aggressively promoting the development of the two-sides IMD process for providing a decoration not only on one side but on both sides of the injection-molded product, as disclosed in JP-A Laid Open No.H06-99457.

According to the two-sides IMD process, two sheets of decoration films are placed between the molds, and upon clamping the molds a molten resin is injected into a cavity defined by the molds. At this stage, the molten resin should be injected into between the two decoration films, and hence an area where the two decoration films are not overlapping have to be secured. Accordingly, as shown in FIG. 17, the decoration film 100 is disposed on the side of a movable mold 201 so as to move lengthwise, while the decoration film 110 is disposed on the side of a fixed mold 202 so as to move laterally, so that a molten resin can be injected from a sprue 254 located at a position where the two decoration films 100, 110 are not overlapping, thus to be supplied into a molding space defined by cavities 228, 258 through a runner 256.

In the two-sides IMD process, when the molds are clamped, inserts 220, 250 tightly hold the decoration films 100, 110 therebetween, thus to keep the decoration films from stretching freely. This causes the decoration film to be wrinkled or torn during the injection-molding process. To avoid such problem, both of the fixed mold and the movable mold of the two-sides IMD molding die are provided with a predetermined clearance A to secure a passage for the decoration films 100, 110 (Ref. FIG. 18A). The clearance A has a dimension substantially the same as the thickness of the two decoration films, so as to avoid imposing the clamping pressure on the decoration films.

DISCLOSURE OF THE INVENTION

Problem to be Solved by the Invention

Since the two decoration films are overlapping in an area close to the cavities 228, 258 of the molds, the clearance corresponding to such area is fully occupied with the two decoration films without a gap. On the other hand, however, only one of the decoration films is disposed in an area close to the runner 256 through which the molten resin 60 is supplied from the sprue 254 to the cavities. Accordingly, a gap is produced on a surface of the mold because of the clearance A (Ref. FIGS. 18B and 19). As a result, the molten resin leaks out of the runner 256, thus forming a resin flash 260d around a runner portion 260c of the molded product 260, as shown in FIG. 20. The resin flash 260d intrudes into the cavities during the process of successively producing the molded products, to thereby incur defects in the products.

Accordingly, it is an object of the present invention to solve the foregoing issue, by providing a two-sides IMD mold that can minimize formation of the resin flash around the runner portion and a method of manufacturing a molded product with such molding die.

Means of Solving the Problem

The present inventor(s) made the following invention in order to solve the above problem. A first aspect of the present invention provides a two-sides in-mold decoration molding die, comprising:

a first mold including a first cavity, on which a first decoration film is to be movably disposed in a first direction and parallel to a first cavity forming face where the first cavity is provided, so as to pass over the first cavity;

a second mold including a second cavity, on which a second decoration film is to be movably disposed in a second direction intersecting the first direction and parallel to a second cavity forming face where the second cavity is provided, so as to pass over the second cavity, the second mold being provided with a protruding section including a runner at a position corresponding to a non-passing region of the second decoration film of the second cavity forming face, and being placed so as to oppose the first mold, and being relatively movable with respect to the first mold so as to be clamped thereto and separated therefrom;

wherein upon clamping the first and the second molds, an upper surface of the protruding section and the first decoration film come close to each other, so as to define in the runner a molten resin path that guides the molten resin to pass between the first and the second decoration films, thereby preventing the molten resin from leaking; and the molten resin is injected into the first and the second cavities to produce a molded product to which the first and the second decoration films are integrally adhered.

According to a second aspect of the present invention, there is provided the two-sides in-mold decoration molding die according to the first aspect, wherein a height of the protruding section located in the non-passing region of the second decoration film of the second cavity is substantially the same as a thickness of the second decoration film.

According to a third aspect of the present invention, there is provided the two-sides in-mold decoration molding die according to the first or second aspect, wherein the protruding section is defined by an insertion hole formed in the non-passing region of the second decoration film, and a protrusion forming block to be inserted in the insertion hole; and the protrusion forming block provided with the runner on an upper surface thereof is inserted in the insertion hole with an uppermost portion thereof protruding outside to constitute the protruding section.

According to a fourth aspect of the present invention, there is provided the two-sides in-mold decoration molding die according to the first aspect, wherein the first and the second molds are respectively provided with inserts oriented such that opposing faces of the inserts constitute the cavity forming faces when the molds are clamped, and a die sets for holding the inserts so as to insert the inserts therein, in which faces of the die sets on the respective molds confronting each other serve as clamping force supporting portions.

According to a fifth aspect, there is provided the two-sides in-mold decoration molding die according to the fourth aspect, wherein the first and the second molds are formed such that the first and the second cavity forming faces of the inserts are recessed with respect to the clamping force supporting portions of the die sets.

According to a sixth aspect of the present invention, there is provided a method of manufacturing a two-sides in-mold decoration molded product utilizing a molding die including a first mold and a second mold respectively having a first cavity forming face and a second cavity forming face, the first cavity forming face and the second cavity forming face being provided with a first cavity and a second cavity respectively, comprising:

disposing a first decoration film on the first mold so as to move in a first direction and parallel to the first cavity forming face where the first cavity is provided, while passing over the first cavity;

disposing a second decoration film on the second mold so as to move in a second direction intersecting the first direction and parallel to the second cavity forming face where the second cavity is provided, while passing over the second cavity, the second mold including a runner on the second cavity forming face through which to supply the molten resin to the cavity, and a protruding section formed thereon so as to surround the runner located in a region to be directly opposed to the first decoration film upon clamping the second cavity forming face, with not to overlap the protruding section of the second mold;

clamping the first mold and the second mold with the two decoration films held therebetween;

causing an upper surface of the protruding section and the first decoration film to contact with each other in a region where only the first decoration film is disposed as a consequence of the clamping; and injecting the molten resin via the runner into the first and the second cavities so as to form a resin molded product and to integrally adhere the first and the second decoration films to a surface of the resin molded product, while keeping the upper surface of the protruding section and the first decoration film in mutual contact thereby preventing the molten resin from leaking through between the second cavity forming face and the first decoration film.

According to a seventh aspect of the present invention, there is provided the method according to the sixth aspect, further comprising:

setting a height of the protruding section to be substantially the same as a thickness of the second decoration film, causing the protruding section to contact with the first decoration film upon clamping the molds, so that the second cavity forming face and the first decoration film make close contact with each other.

Effect of the Invention

The two-sides IMD molding die according to the present invention is provided with the runner through which the molten resin is supplied to the cavities. And the protruding section is formed at least in an area around the runner located in the region excluded from the path of the second decoration film disposed so as to pass over the cavities, i.e. a region except the path of the second decoration film. Such structure causes the upper surface of the protruding section and the first decoration film to come close to each other, thus resulting in defining a moving path for the molten resin. Since the upper surface of the protruding section and the first decoration film are located close to each other in the molten resin moving path, the molten resin can be prevented from leaking out of the runner formed in the protruding section. Accordingly, a resin flash is not formed around the runner. Consequently, when successively producing the two-sides molded products, the conventional disadvantage of intrusion of the resin flash formed through a preceding process into the cavity can be eliminated, and hence defective products can be prevented.

BEST MODE FOR CARRYING OUT THE INVENTION

Figure 1:
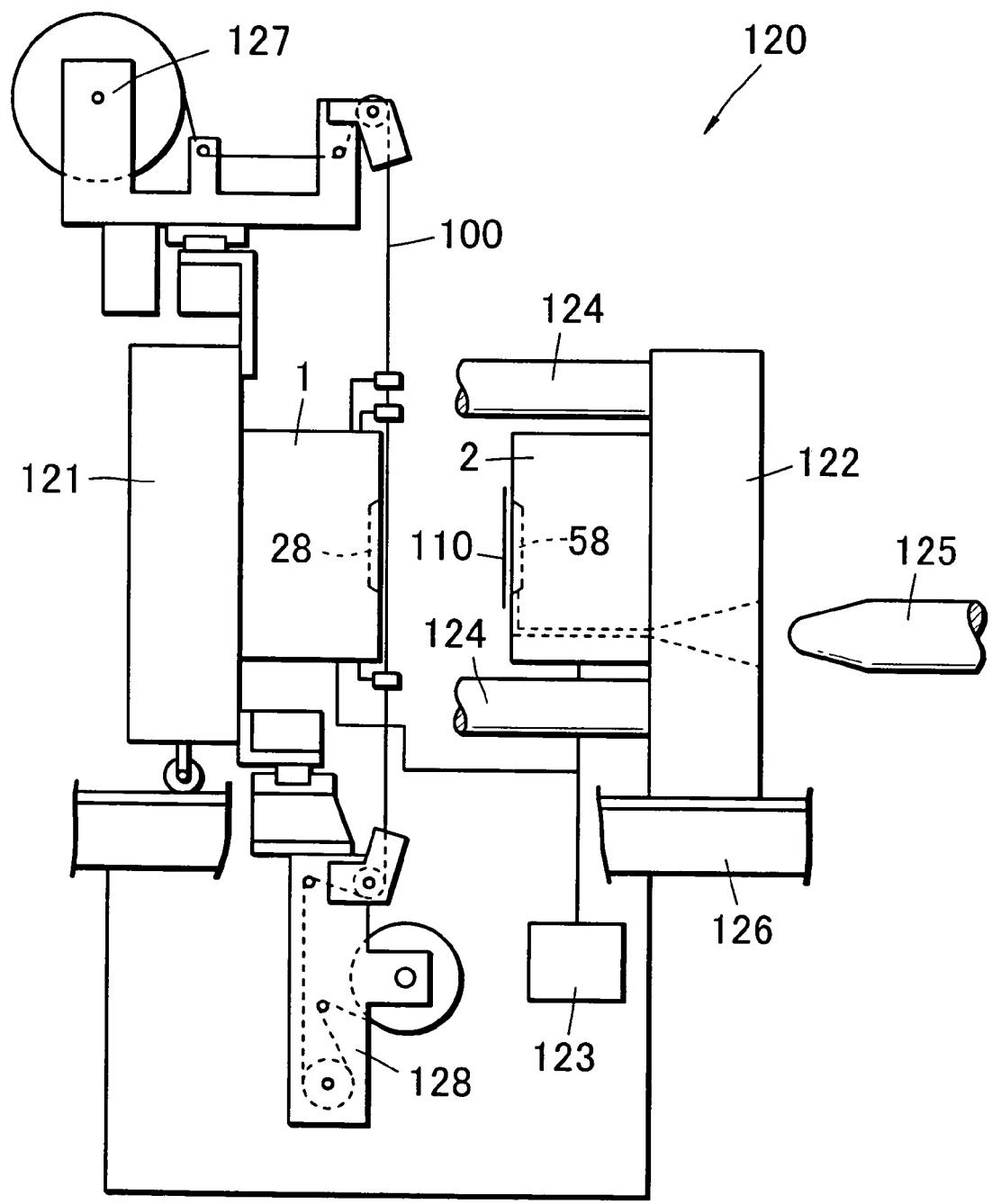
FIG. 1 is a schematic side view showing a structure of a two-sides IMD apparatus on which a two-sides IMD molding die according to an embodiment of the present invention is mounted.

Before the description of the present invention proceeds, it is to be noted that like parts are designated by like reference numerals throughout the accompanying drawings.

FIG. 1 is a schematic side view showing a structure of a two-sides IMD apparatus including a two-sides IMD molding die according to an embodiment of the present invention. As shown in FIG. 1, the two-sides IMD apparatus 120 is provided with a movable platen 121 for mounting a movable mold 1, a fixed platen 122, for mounting a fixed mold 2 and an injection nozzle 125 through which a molten resin is injected into cavities defined by the molds.

According to the embodiment, the fixed platen 122 is fixed to a frame 126, and tie bars 124 fixed to the fixed platen 122 serve as guides along which the movable platen 121 moves so as to be clamped to and separated from the fixed platen 122.

Moving the movable platen 121 causes a parting face of the fixed mold 2 and a parting face of the movable mold 1 to be brought into contact with each other under pressure, thus to present a clamped state where a molding space is defined by second cavities 58 of the fixed mold 2 and first cavities 28 of the movable mold 1, and also causes the parting faces of the respective molds to be separated from each other, thus to present an open state.

Basically the two molds, i.e. the fixed mold 2 and the movable mold 1 are employed to define the molding space, while it is also possible to employ an additional member such as an intermediate mold to be placed between the two molds to thereby define a molding space.

The movable platen 121 is provided with a lengthwise film feeder 127 and a lengthwise film takeup device 128. Likewise, the fixed platen 122 is provided with a lateral film feeder and a lateral film takeup device, though these are not shown.

The lengthwise film feeder 127 and the lengthwise film takeup device 128 serve to move a first decoration film 100 in a lengthwise (vertical) direction with respect to the first cavities 28 of the movable mold 1. The lateral film feeder and the lateral film takeup device serve to move the second decoration film 110 in a direction (horizontal) intersecting the moving direction of the first decoration film 100, i.e. in a lateral direction, with respect to the second cavities 58 of the fixed mold 2.

The first decoration film 100 is lengthwise moved parallel to the parting face of the movable mold 1, with a predetermined clearance therebetween. The second decoration film 110 is laterally moved parallel to the parting face of the fixed mold 2, with a predetermined clearance therebetween. In other words, the first and the second decoration films 100, 110 are disposed so as to intersect each other between the movable mold 1 and the fixed mold 2, and the intersection constitutes an overlapping section of the two decoration films. The overlapping section is formed close to the cavities of the two molds. The respective decoration films are stuck to the respective molds by suction mechanisms (not shown), and under such state the molten resin is injected so as to be supplied into the molding space through an area between the two decoration films as will be described later, so that the decoration films apply a decoration on both sides of the resin molded product.

Mounting positions of the film feeder and the film takeup device on the movable mold and the fixed mold are not limited to the positions shown in FIG. 1. The lengthwise film feeder 127 may be located at a lower portion of the movable platen 121, and the lengthwise film takeup device 128 may be located at an upper portion of the movable platen 121. Alternatively, the film feeder 127 and the film takeup device 128 for the movable mold may be located at left and right lateral portions of the movable platen 121, and the film feeder and the film takeup device for the fixed mold may be located at upper and lower portions of the fixed platen 122. The film feeders and the film takeup devices may also be directly mounted to the frame.

In a word, any configuration may be made as long as the first and the second decoration films 100, 110 can be moved so as to intersect each other and be disposed at a position corresponding to the parting face of the fixed mold 2 or that of the movable mold 1, before performing the two-sides IMD process.

Figure 2:
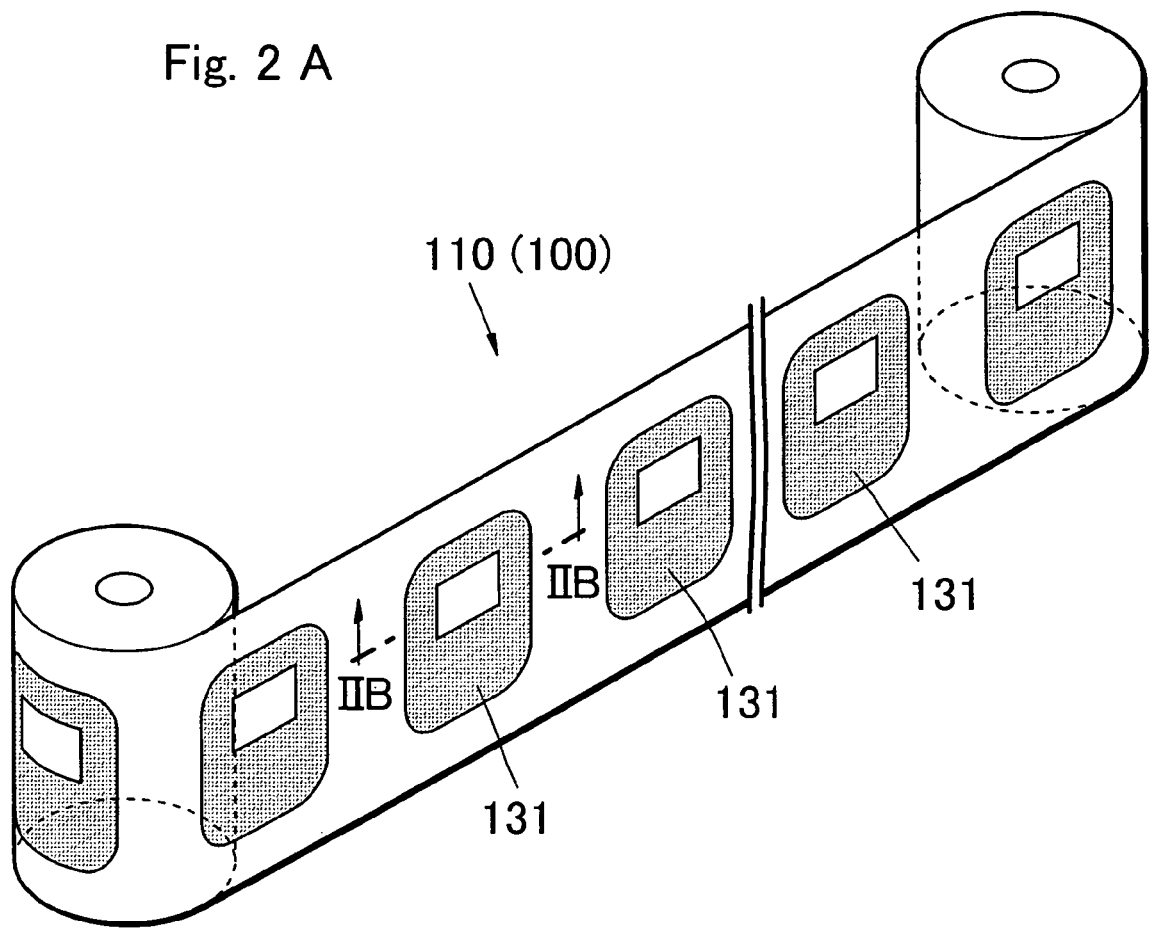
FIG. 2A is a perspective view showing the schematic appearance of a decoration film employed in the two-sides IMD apparatus according to FIG. 1.
FIG. 2B is a schematic cross-sectional view taken along the line IIB-IIB in FIG. 2A.
Figure 2:
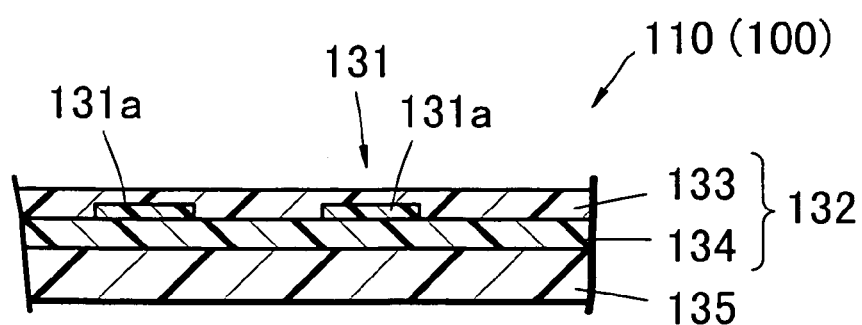

The decoration films will now be described. As shown in FIG. 2A, the first and the second decoration films employed in the two-sides IMD apparatus have a similar laminated structure except for a difference in a pattern orientation due to the difference in the film feeding directions as stated above. Accordingly, the second decoration film will be referred to for the purpose of description. The second decoration film 110 is initially roll-wound on the film feeder and fed out so as to move over the parting face of the fixed mold to be subjected to the two-sides IMD process, to be thereafter roll-wound on the film takeup device.

Referring to FIG. 2B, the second decoration film 110 is provided with designs 131 longitudinally aligned with intervals. The second decoration film 110 includes a base film 135 and a decoration layer 132, and the decoration layer 132 includes an release protection layer 134, on which a design ink layer 131a constituting the designs 131 is provided. On the design ink layer 131a an adhesive layer 133 is provided, so that the adhesive layer 133 adheres to the molten resin upon contacting therewith in the two-sides IMD process, and the design ink layer 131a is stripped together with the release protection layer 134 from the base film 135, thus to transfer the decoration layer 132 on a resin molded product 151.

When performing the two-sides IMD process, the first and second decoration films 100,110 each constituted of the base film 135 and the decoration layer 132 including the release protection layer 134, the design ink layer 131*a*, and the adhesion layer 133 formed on the base film 135 are employed. The process includes holding the first and second decoration films 100, 110 by the molds, injecting the resin into the cavities to fill the cavities, cooling to form a resin molded product 151 and to adhere the first and second decoration film 100, 110 on surfaces thereof at the same time, and stripping the base film thus to transfer the decoration layers 132 to the surfaces of the resin molded product 151 (See FIGS. 3A to 3C).

Examples of a suitable material for the base film 135 include a monolayer film constituted of a polycarbonate resin, a polyamide resin, a polyimide resin, a polyester resin, an acrylic resin, an olefin resin, a urethane resin, an acrylonitrile buthadiene styrene resin, or the like, or a laminated film or a copolymerized film composed of two or more of the foregoing resins. In other words, a material that serves as a base film of an ordinary decoration film may be employed.

A preferable thickness of the base film 135 is 5 to 500 μm. In the case where the base film is thinner than 5 μm, it is difficult to handle the film when disposing the film on the mold and a stable production performance cannot be expected. When the base film is thicker than 500 μm, the film has an excessive rigidity which is unsuitably used for the molding process.

In the case where the decoration layer 132 has good releasability from the base film 135, the decoration layer 132 may be laminated directly on the base film 135. For improving releasability of the decoration layer 132 from the base film 135, a mold release layer (not shown) may be provided all over the base film 135, prior to forming the decoration layer 132. The mold release layer is released together with the base film 135 from the decoration layer 132 when stripping the base film 135 after the two-sides IMD process, though the mold release layer may sometimes incur an interlayer delamination, and a portion thereof may remain on an outermost surface of the decoration layer 132. Examples of a suitable material for the mold release layer include a releasing agent such as an acrylic resin, a nitrocellulose resin, a polyurethane resin, a chlorinated rubber resin, a vinylchloride-vinylacetate copolymer resin, a polyamide resin, a polyester resin, an epoxy resin, a polycarbonate resin, an olefin resin, an acrylonitrile buthadiene styrene resin, or a composite releasing agent including two or more of those cited above.

A preferable thickness of the mold release layer is 0.5 to 50 μm. When the film thickness is less than 0.5 μm, sufficient adhesion cannot be achieved, and when the film thickness is greater than 50 μm, it takes too much time in drying after printing. The mold release layer may be formed by a coating process such as roll coating or spray coating, or by a printing process such as gravure printing, screen printing.

Figure 4:
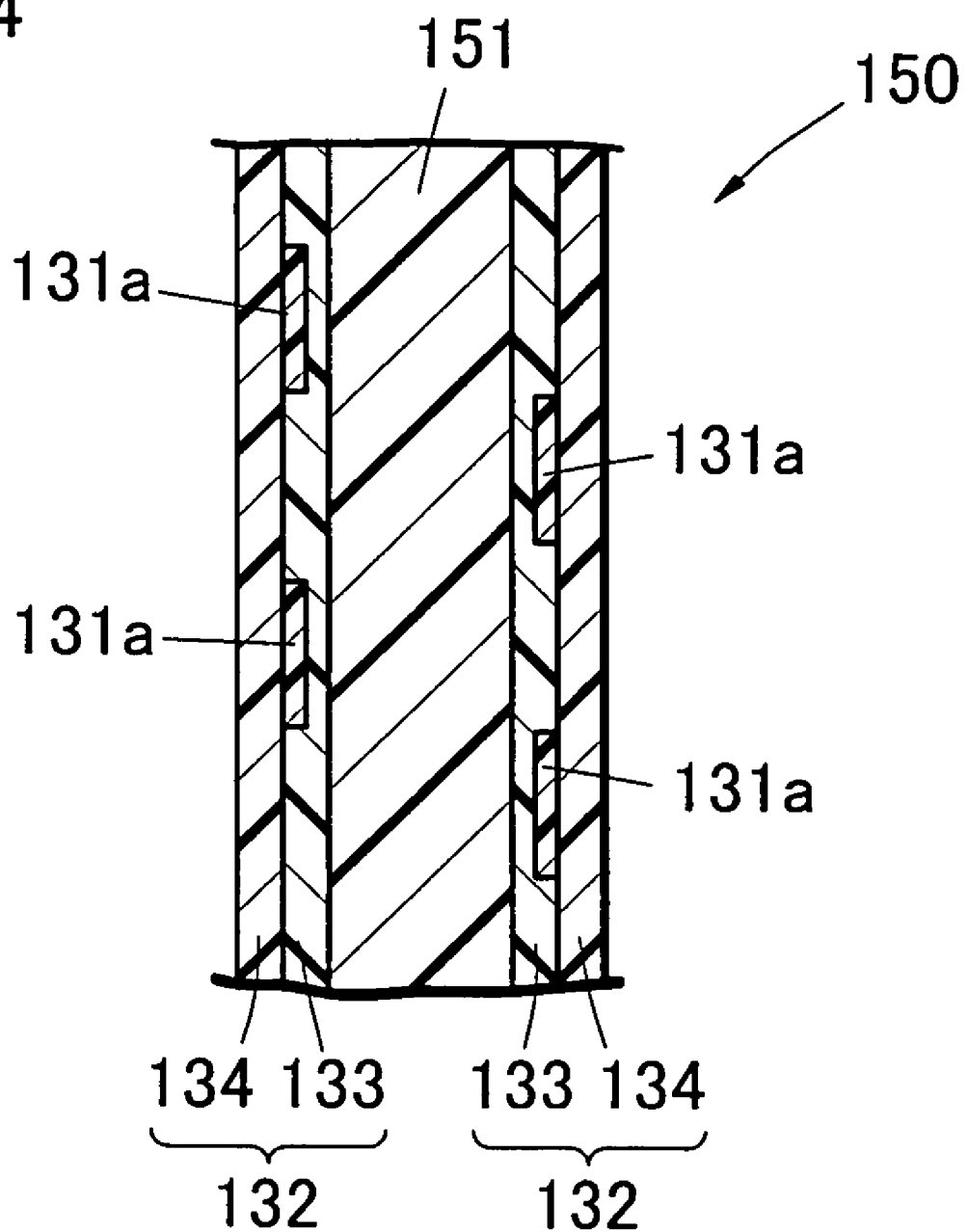
FIG. 4 is a schematic cross-sectional view showing a two-sides IMD molded product formed by a method of the two-sides IMD according to the embodiment.

The release protection layer 134 is formed all over or partially on the base film 135 or the mold release layer. The release protection layer 134 is released from the base film 135 or the mold release layer upon stripping the base film 135 after the two-sides IMD process, and then constitutes an outermost surface of the two-sides IMD molded product 150 as shown in FIG. 4.

In the case where the release protection layer 134 has incurred interlayer delamination, the delaminated surface constitutes the outermost surface. In the case where the mold release layer has incurred interlayer delamination, the portion of the mold release layer remaining on the decoration layer surface constitutes the outermost surface of the resin molded product 150. Examples of a suitable material for the release protection layer 134 include an acrylic resin, a nitrocellulose resin, a polyurethane resin, a chlorinated rubber resin, a vinylchloride-vinylacetate copolymer resin, a polyamide resin, a polyester resin, an epoxy resin, a polycarbonate resin, an olefin resin, or an acrylonitrile buthadiene styrene resin. When a certain hardness is required for the release protection layer 134, a photocurable resin such as a UV-curable resin, a radiation curable resin such as an electron beam curable resin, or a thermosetting resin may be selectively employed.

A preferable thickness of the release protection layer 134 is 0.5 to 50 μm. When the film thickness is less than 0.5 μm, sufficient adhesion cannot be achieved, and when the film thickness is greater than 50 μm, it takes too much time in drying after printing. The release protection layer 134 may be colored or uncolored. The release protection layer 134 may be formed by a coating process such as roll coating, spray coating, or comma coating, or by gravure printing, screen printing, or the like.

The design ink layer 131*a* is normally formed as a printing layer on the release protection layer 134. The printing layer may be constituted of a colorant containing a pigment or a dye of a desired color as a coloring agent, with a binder resin preferably selected out of an acrylic resin, a nitrocellulose resin, a polyurethane resin, a chlorinated rubber resin, a vinylchloride-vinylacetate copolymer resin, a polyamide resin, a polyester resin, an epoxy resin, and so forth. The printing layer may be formed by an ordinary printing process such as offset printing, gravure printing, or screen printing. When printing a multi-color design or a gradation pattern, the offset printing and the gravure printing are particularly suitable. In the case of a monotone design, a coating process may be employed such as gravure coating, roll coating, or comma coating. The printing layer may be formed all over or in a partial region on the decoration film, according to a desired design.

The design ink layer 131*a* may be constituted of a metal thin film layer, or of a combination of a printing layer and a metal thin film layer. The metal thin film layer, which serves as the design ink layer 131*a* to create a metallic luster, may be formed by vacuum deposition, sputtering, ion plating, or metal plating. In this case, metal such as aluminum, nickel, gold, platinum, chrome, iron, copper, tin, indium, silver, titanium, lead, or zinc, or an alloy or a compound thereof, according to a desired shiny metallic color. When partially forming the metal thin film layer, as one example, there is a process which may include forming a solvent-soluble resin layer except a region where the metal thin film layer is to be provided, forming the metal thin film all over the solvent-soluble resin layer and cleaning with the solvent to remove an unnecessary portion of the metal thin film together with the solvent-soluble resin layer. Water or an aquatic solution is employed as the commonly used solvent in this process. Alternatively the process may include forming the metal thin film layer all over, providing a resist layer on an area where the metal thin film is to remain, performing an acid etching or an alkaline etching to remove a unnecessary area of the metal thin film, and then removing the resist layer. Here, in order to improve the adhesion between other decoration layers and the metal thin film layer, a pre-anchor layer or a post-anchor layer may be provided when forming the metal thin film layer. As a suitable material for the pre-anchor layer and the post-anchor layer, a two-part cured urethane resin, a thermoset urethane resin, a melamine resin, a cellulose ester resin, a chlorine-containing rubber resin, a chlorine-containing vinyl resin, a polyacrylic resin, an epoxy resin, or a vinyl copolymer resin may be used. The pre-anchor layer and the post-anchor layer may be formed by a coating process such as gravure coating, roll coating, or comma coating, or a printing process such as gravure printing or screen printing.

A preferable thickness of the design ink layer 131*a* is 0.5 to 50 μm. When the film thickness is less than 0.5 μm, sufficient design performance cannot be achieved, and when the film thickness is greater than 50 μm, it takes too much time in drying after printing. The metal film layer may preferably have a thickness of 50 to 1200 μm. The reason is that when the thickness of the metal film layer is less than 50 μm a sufficient metallic luster cannot be obtained, while when the thickness is greater than 1200 μm the layer becomes prone to incur a crack.

The adhesion layer 133 serves to adhere the foregoing layers to the surface of the resin molded product 151. The adhesion layer 133 is to be provided on a region to be adhered to the resin molded product 151. When an entire region is to be adhered, the adhesion layer 133 is formed all over the design ink layer 131*a*. When a portion is to be adhered, the adhesion layer 133 is partially formed on the design ink layer 131*a*. The adhesion layer 133 may be constituted of a thermosensitive or a pressure sensitive resin that is compatible with the material of the resin molded product 151. For example, when the resin molded product 151 is of a polyacrylic resin, it is preferable to employ a polyacrylic resin as the adhesion layer 133. When the resin molded product 151 is to be made of a polyphenylene oxide copolymer polystyrene-based copolymer resin, a polycarbonate resin, a styrene resin, or a polystyrene-based blended resin, it is preferable to employ a polyacrylic resin, a polystyrene resin, or a polyamide resin, all of which have an affinity for those resins, as the adhesion layer. In addition, when the resin molded product 151 is of a polypropylene resin, it is preferable to employ a chlorinated polyolefin resin, a chlorinated ethylene-vinylacetate copolymer resin, a cyclized rubber resin, or a cumaroneindene resin.

A preferable thickness of the adhesion layer 133 is 0.5 to 50 μm. When the film thickness is less than 0.5 μm, sufficient adhesion cannot be achieved, and when the film thickness is greater than 50 μm, it takes too much time in drying after printing. The adhesion layer 133 may be formed by a coating process such as gravure coating; roll coating, or comma coating, or by a printing process such as gravure printing, or screen printing.

The structure of the decoration layer 132 is not limited to the foregoing examples. For example, when the design ink layer 131*a* is formed of a material that can achieve excellent adhesion to the resin molded product 151, the adhesion layer 133 may be omitted.

The resin molded product 151 may be transparent, semitransparent, or opaque. It may be preferable to employ a transparent material according to a purpose of the resin molded product, since the decoration is to be provided on both sides of the resin molded product. The resin molded product may be colored or uncolored. As the resin material, it is preferable to employ a thermoplastic resin such as an acrylic resin, a polycarbonate resin, a styrene resin, a polyamide resin, a Noryl (registered trademark) resin, a polyester resin, an olefin resin, a urethane resin, or an acrylonitrile buthadiene styrene resin. In addition, a general-purpose engineering resin such as a polyphenylene oxide polystyrene resin, a polycarbonate resin, a polyacetal resin, a polyacrylic resin, a polycarbonate modified polyphenylene ether resin, a polyethylene terephthalate resin, a polybuthylenetelephthalate resin, or a ultra-high molecular polyethylene resin; or a super engineering resin such as a polysulfon resin, a polyphenylene sulfide resin, a polyphenylene oxide resin, a polyallylate resin, a polyetherimide resin, a polyimide resin, a liquid crystal polyester resin, or a polyallyl-based thermoresistant resin may be used.

Figure 3:
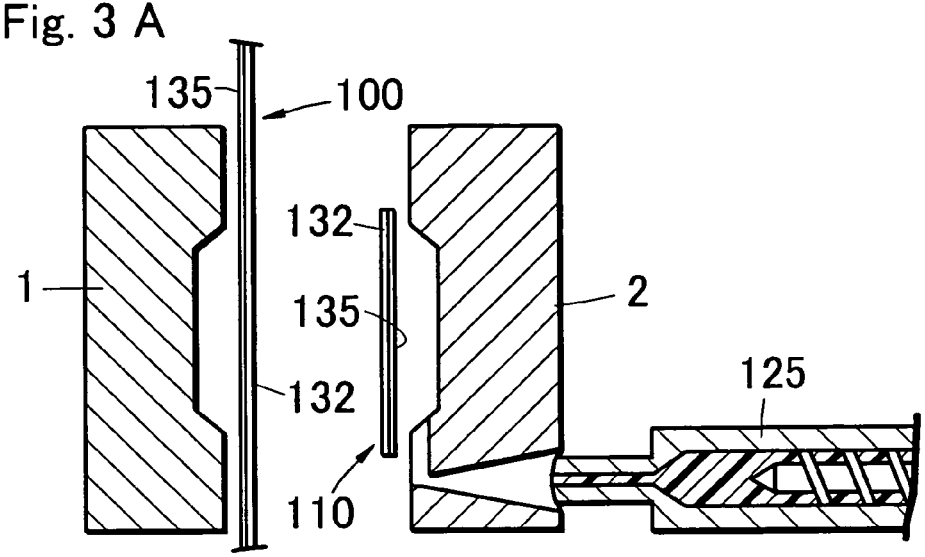
FIG. 3A is a schematic cross-sectional side view showing a two-sides IMD process performed by the two-sides IMD apparatus according to FIG. 1.
FIG. 3B is a schematic cross-sectional side view showing a two-sides IMD process performed by the two-sides IMD apparatus according to FIG. 1.
FIG. 3C is a schematic cross-sectional side view showing a two-sides IMD process performed by the two-sides IMD apparatus according to FIG. 1.
Figure 3:
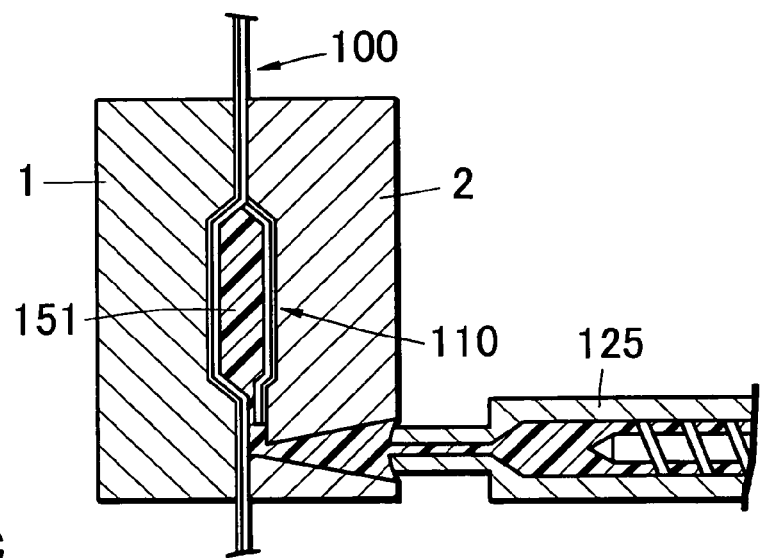
Figure 3:
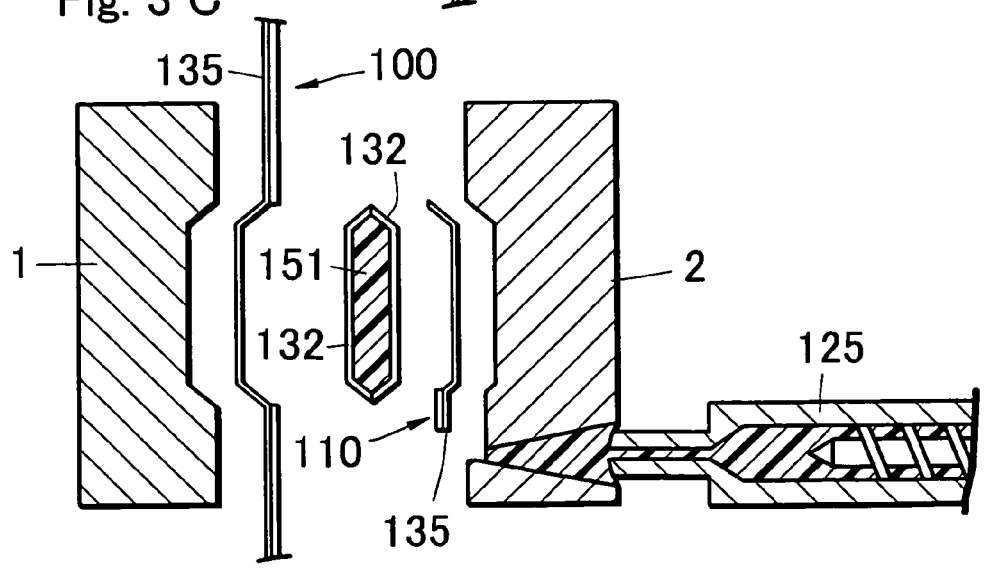

A method of providing a decoration on surfaces of a resin molded product utilizing the decoration films and a two-sides IMD process, based on an injection-molding method, will now be described hereunder. FIGS. 3A to 3C are cross-sectional views schematically showing a flow of a resin, for assisting the description. Referring first to FIG. 3A, the first and the second decoration films 100, 110 are intermittently fed into a molding die composed of the movable mold 1 and the fixed mold 2. Here, when intermittently feeding the decoration films 100, 110, the position of the decoration films 100, 110 may be detected by sensors (not shown) before holding the decoration films 100, 110 between the movable mold 1 and the fixed mold 2 for fixing, so that the decoration films 100, 110 can always be fixed at predetermined positions, by which position shifts of the design ink layers 131*a* can be prevented. Then as shown in FIG. 3B, upon clamping the molds 1, 2, a molten resin is injected into the cavities through a gate provided on the fixed mold 2 so as to fill the cavities with the resin, thus to form a resin molded product 151 and to simultaneously adhere the decoration films 100, 110 to surfaces of the resin molded products, resulting in two sides IMD molded products 150. At this stage, supplying a refrigerant from a coolant supplier 123 shown in FIG. 1 so as to cool the cavities accelerates the solidification of the molten resin, thereby shortening a time required for the injection molding process.

Referring now to FIG. 3C, after cooling the two-sides IMD resin molded product 150, the molds 1, 2 are opened and the two-sides IMD resin molded product 150 is taken out therefrom. At this stage the first and the second decoration films 100, 110 have been integrally adhered to the resin molded product 151. Stripping the base films 135 as a final step leaves the decoration layers 132 transferred to the surfaces of the resin molded product 151, thus completing a cycle of the two-sides IMD process.

Figure 5:
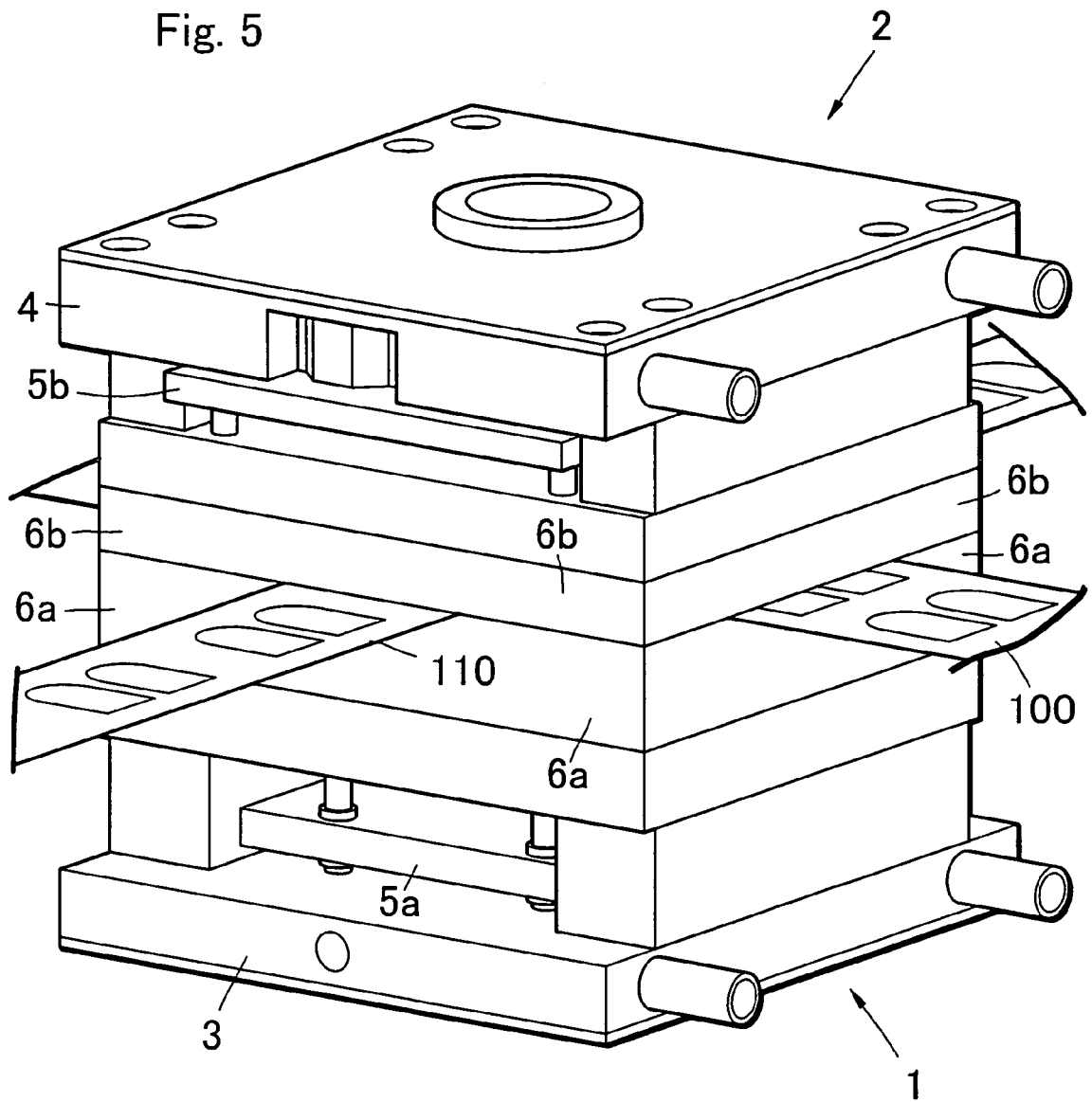
FIG. 5 is a perspective view showing a clamped state of a movable mold and a fixed mold of the two-sides IMD molding die according to the embodiment on the present invention.

A general structure of the molds 1, 2 is as follows. FIG. 5 is a perspective view showing a clamped state of the movable mold 1 and the fixed mold 2 according to this embodiment. The molds 1, 2 are subjected to a clamping force via clamping force supporting faces 10*a*, 10*b* in the clamped state, and the contact interface of the supporting faces 10*a*, 10*b* serves as the parting faces. These molds 1, 2 are the molds employed in the two-sides IMD apparatus that provide a decoration on both sides of a thin plate-shaped resin molded product 151, at the same time as molding.

Now description will be given on the structure of the respective molds 1, 2. The movable mold 1 and the fixed mold 2 shown in FIG. 5 are respectively provided with inserts 20, 50 having two molding cavities 28, 58 into which the decoration films 100, 110 are to be disposed, and die sets 3, 4 for fixing the inserts 20, 50 (See FIGS. 6A, 9A).

Figure 6:
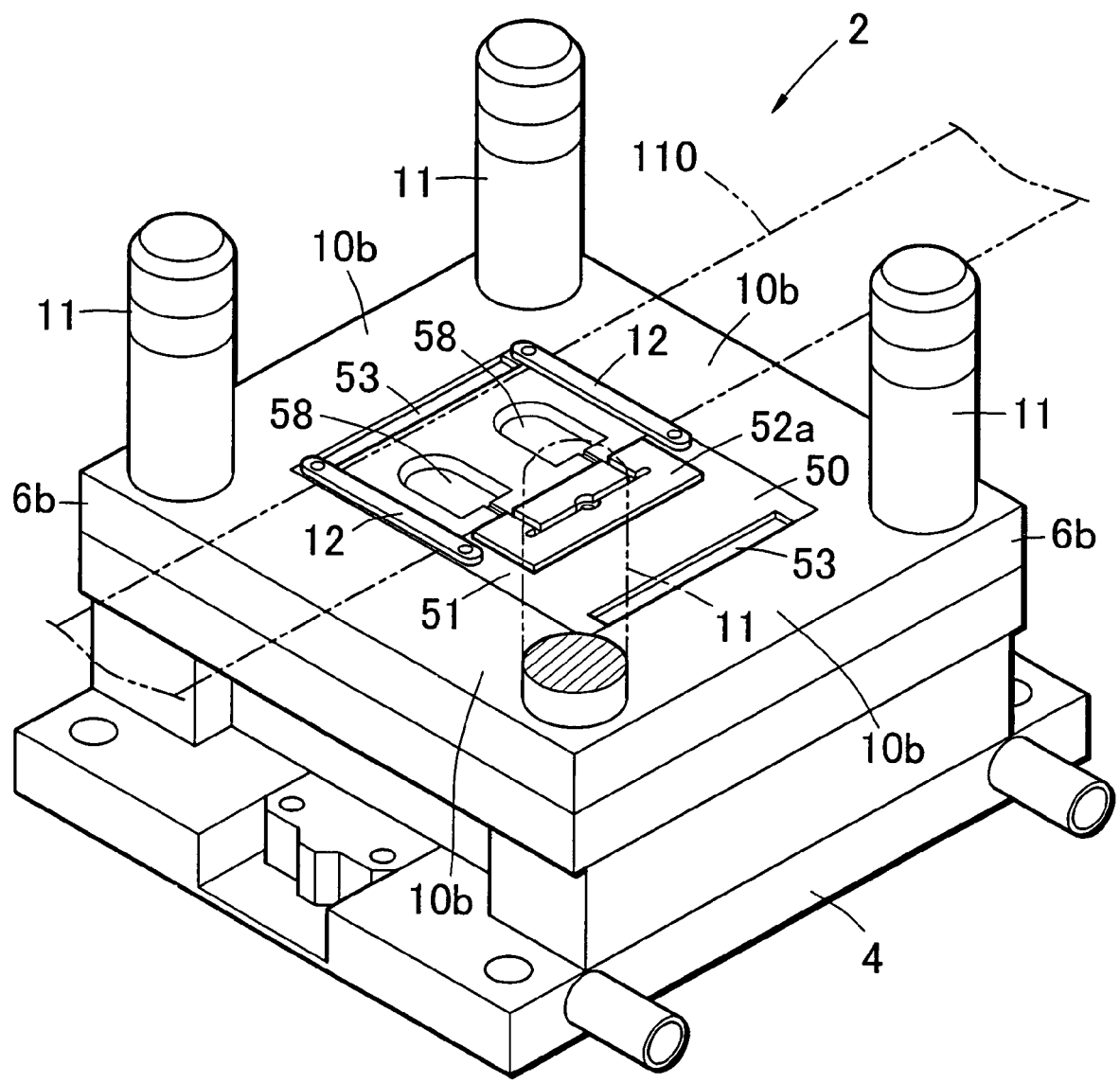
FIG. 6A is a perspective view showing a structure of the fixed mold employed in the two-sides IMD molding die according to FIG. 5.
FIG. 6B is a plan view showing a structure of the fixed mold according to FIG. 6A.
Figure 6:
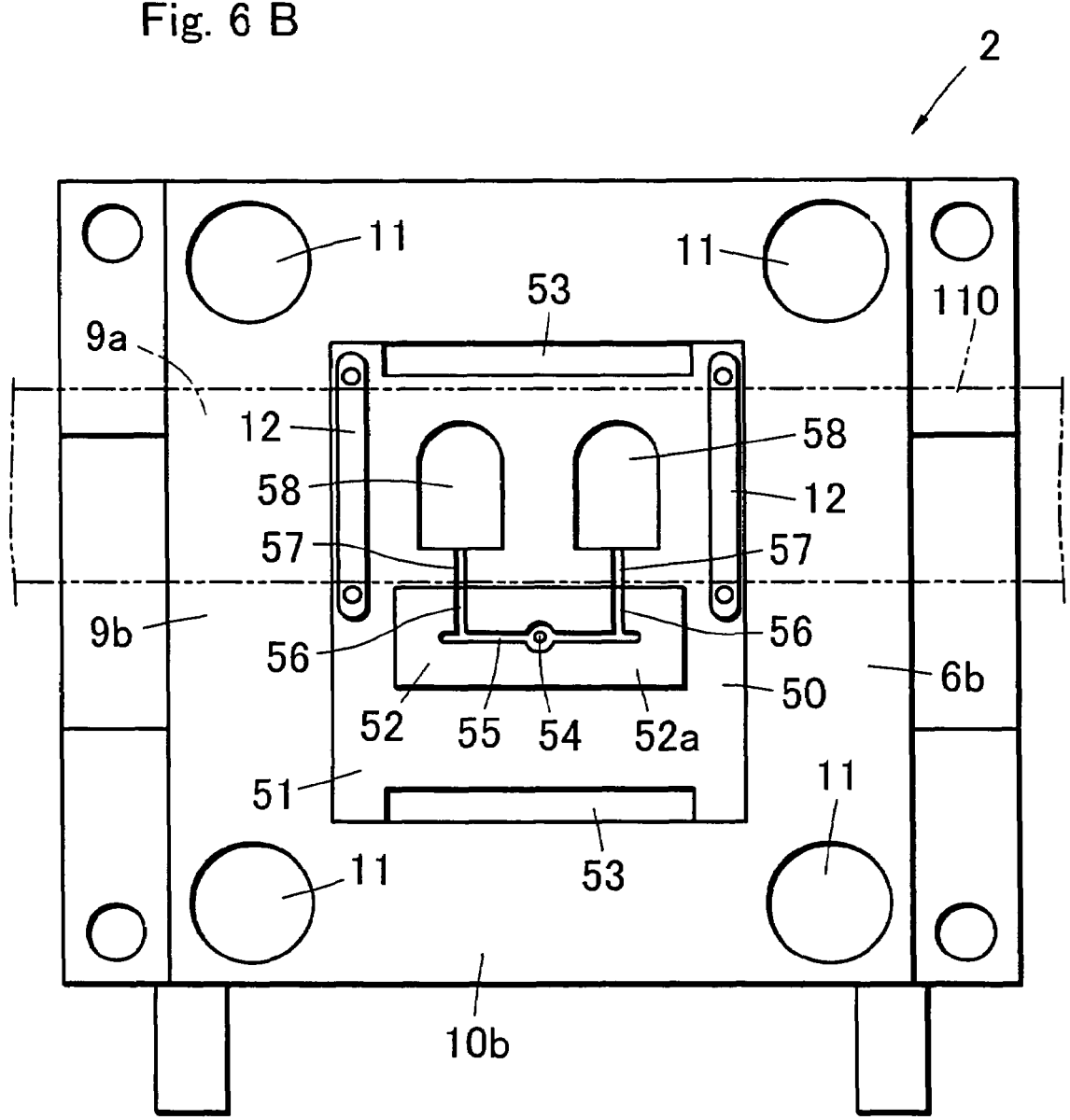
Figure 7:
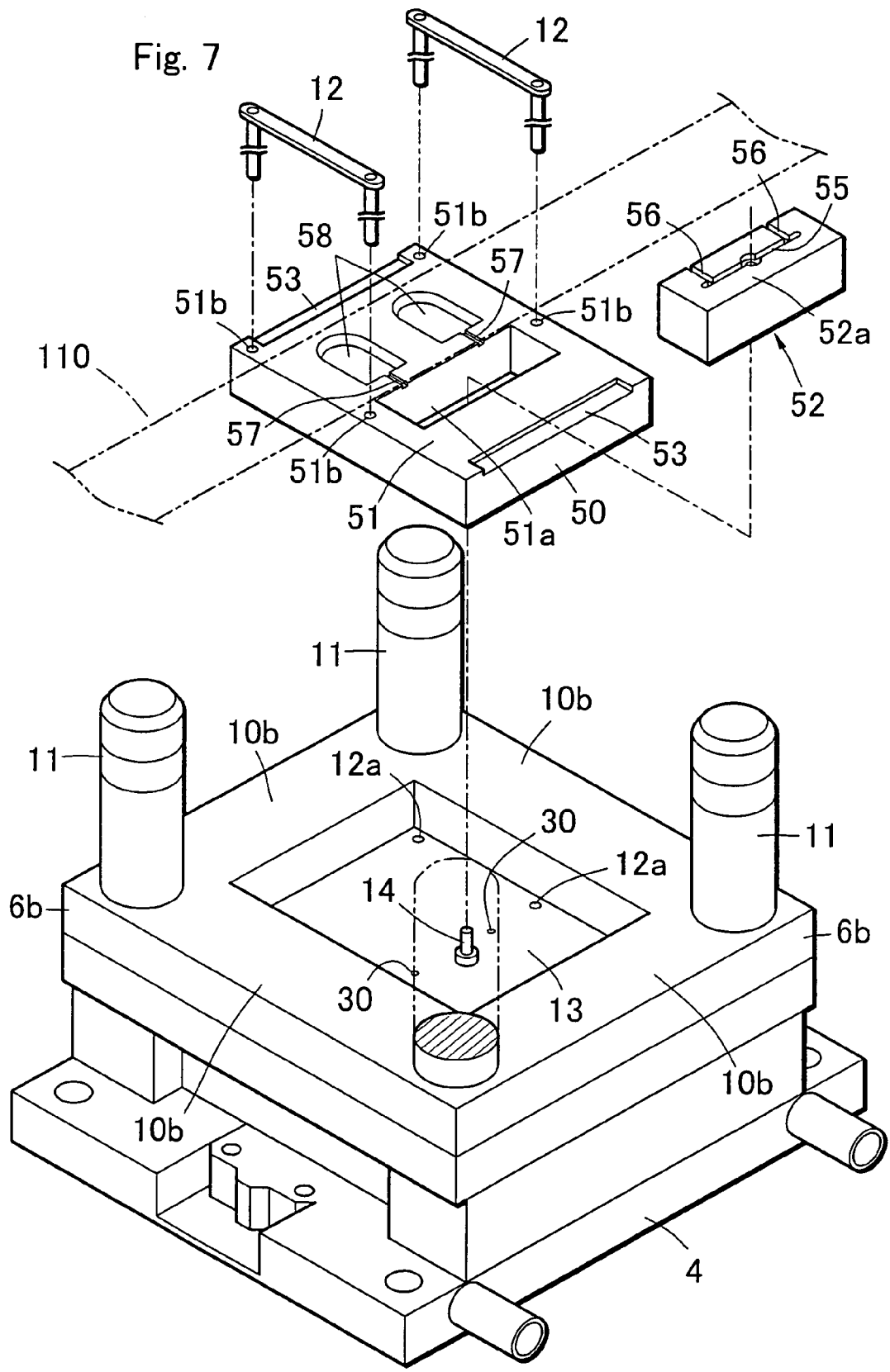
FIG. 7 is an exploded perspective view showing the fixed mold according to FIG. 6A.

First, the fixed mold 2 will be described. As shown in FIGS. 6A, 6B and 7, the fixed mold 2 is provided with the insert 50 fixedly inserted in a pocket 13 formed in a recessed shape on the face of the fixing die set 4 confronting the mating mold 1. The insert 50 may be fixed, for example, with fixing screws (not shown). When fixing the insert 50 with the fixing screws, it is preferable to provide screw holes on a wall 6*b* surrounding the pocket 13 of the die set 4, at a position not opposing the movable mold 1. The wall 6*b* around the pocket 13 of the die set 4 of the fixed mold 2 constitutes the clamping force supporting face 10*b*, which serves as the parting face that makes contact with the movable mold 1 in the clamped state. The insert 50 is provided with two clamps 12 that serve to hold the second decoration film 110.

The insert 50 includes the second cavities 58 on a second cavity forming face 51 as will be later described, and the rear surface of the second cavity forming face 51 is formed in a smooth plane so as to fully contact with a mounting face inside the pocket 13 of the die set 4 when the insert 50 is mounted on the die set 4.

The die set 4 is provided with guide pins 11 at the four corners of its parting face, so as to maintain the same clamping position with the movable mold 1.

The clamps 12 serve to hold the second decoration film 110 so as to press it against the second cavity forming face 51 of the insert 50 as shown in FIG. 6A, and are oriented parallel to each other in a direction orthogonal to the longitudinal direction of the second decoration film 110. Each of the clamps 12 includes an elongated plate-shaped film holder and two legs projecting from portions close to the ends of the film holder, as shown in FIG. 7. The legs are designed so as to penetrate clamp through holes 51b provided on the insert 50 and, once fixed to the die set 4, be inserted into clamp insertion holes 12a provided on the mounting face of the die set 4. The die set 4 is provided with a clamp moving mechanism 5b (See FIG. 5) to be connected to the legs of the clamps 12 inserted into the clamp insertion holes 12a, so as to move the clamps 12 up and down, and thus to alternately hold and release the second decoration film 110.

When the clamps 12 are lifted, the second decoration film 110 is released from the clamps 12 and hence is movable in a longitudinal direction thereof. When the clamps 12 are lowered, the second decoration film 110 is pressed against the second cavity forming face 51 of the insert 50 by the clamps 12, to be retained where it is. It is generally when the two molds 1, 2 are open and the decoration film 110 is moved, that the clamps 12 are at the lifted positions, while it is when the decoration film 110 is set in place and the molten resin is about to be injected, i.e. when the decoration film 110 has to be retained in place, that the clamps 12 are at the lowered positions.

The insert 50 used with the fixed mold 2 will now be described. As shown in FIGS. 6B and 7, the insert 50 is of a flat plate shape, and a surface thereof is the second cavity forming face 51 where the second cavities 58 are formed, and the opposite surface constitutes the mounting face when mounted on the die set 4. The second cavity forming face 51 is provided with runners 55, 56 through which to supply the molten resin to the second cavities 58, and a sprue 54 through which to supply the molten resin injected from an injection nozzle 125 toward the second cavity forming face 51.

The second cavity forming face 51 of the insert 50 is also provided with cutaway portions 53 at a position confronting the clamps 16, to avoid interference with clamps 16 of the movable mold 1 when the movable mold 1 and the fixed mold 2 are clamped.

To the second cavities 58, the molten resin is injected through a sprue bush 14 provided in the pocket 13 of the die set 4 and the sprue 54 of the insert 50. As shown in FIG. 6B, the second cavity forming face 51 of the fixed mold 2 is configured to allow the second decoration film 110 to pass in a lateral direction, and a region where the second decoration film 110 passes is defined as a second decoration film passing region 9a. On the other hand, a region where the second decoration film 110 does not pass is defined as a second decoration film non-passing region 9b. The second cavities 58 are located in the second decoration film passing region 9a, while the sprue 54 is located in the second decoration film non-passing region 9b. Accordingly, with respect to the runners 55, 56, 57, which are communicating the second cavities 58 and the sprue 54, the runner 57 as a part of the runner 55, 56, 57, is located in the second decoration film passing region 9a, and the remaining portions 55, 56 are located in the second decoration film non-passing region 9b.

The insert 50 is also provided with the clamp through holes 51b at the corner regions as stated above, into which the clamp legs are to be inserted respectively. In addition, the insert 50 is provided with suction holes (not shown) on its rear surface (mounting face) communicating with the second cavity forming face 51, through which the second decoration film 110 is sucked toward the second cavity forming face 51 of the insert 50 when mounted on the die set 4, as will be described later.

In an area on the second cavity forming face 51 including the sprue 54 and the runners 55, 56, a protruding section 52a is provided. The protruding section 52a is provided only in the second decoration film non-passing region 9b as shown in FIG. 8C, and its height D1 is set to be substantially the same as a thickness D2 of the second decoration film 110.

The protruding section 52a is formed by inserting a protrusion forming block 52 into an insertion hole 51a penetrating the insert 50 and provided at the second decoration film non-passing region 9b in the insert 50. The protrusion forming block 52 is made to be slightly thicker than the thickness of the insert 50, and the difference in thickness corresponds to the protruding height D1 of the protruding section 52a. When the height D1 of the protruding section 52a has to be adjusted, the protrusion forming block 52 may be shaved, or a thin film or the like may be laid in the insertion hole 51a for the protrusion forming block 52.

Figure 8:
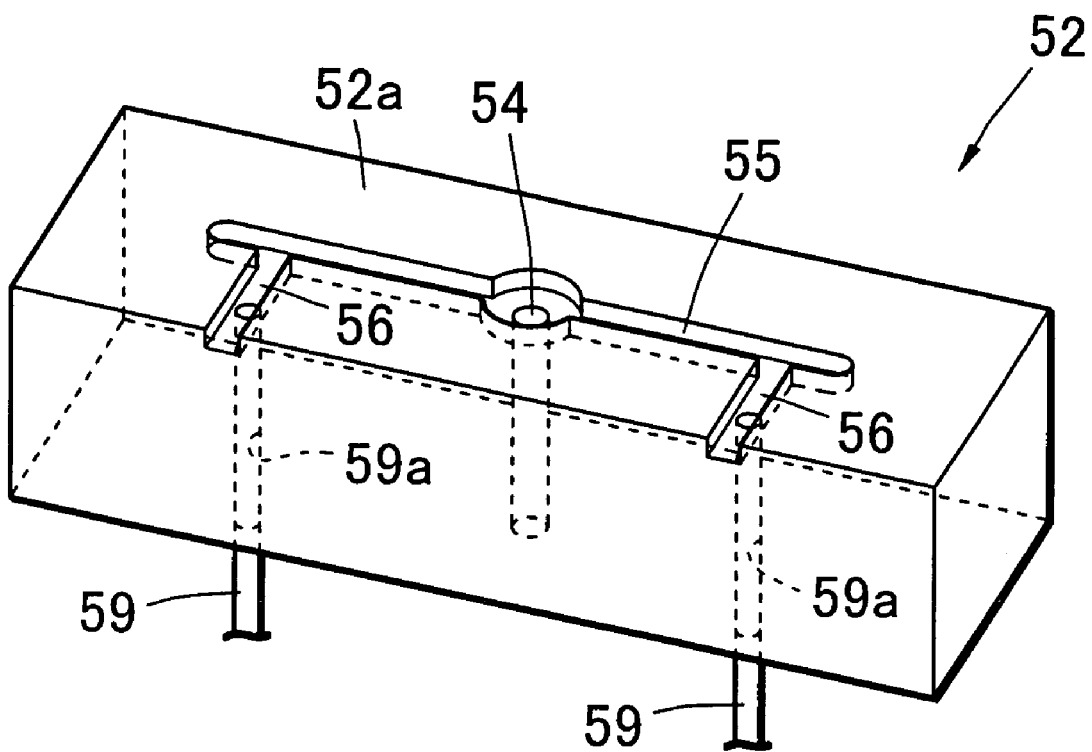
FIG. 8A is a perspective view showing a structure of the protrusion forming block to be placed on the fixed mold according to FIG. 6A.
FIG. 8B is a plan view showing the structure of the protrusion forming block to be placed on the fixed mold according to FIG. 6A.
FIG. 8C is an enlarged fragmentary perspective view showing a state where the protrusion forming block is fitted in an insert of the fixed mold according to FIG. 6A.
Figure 8:
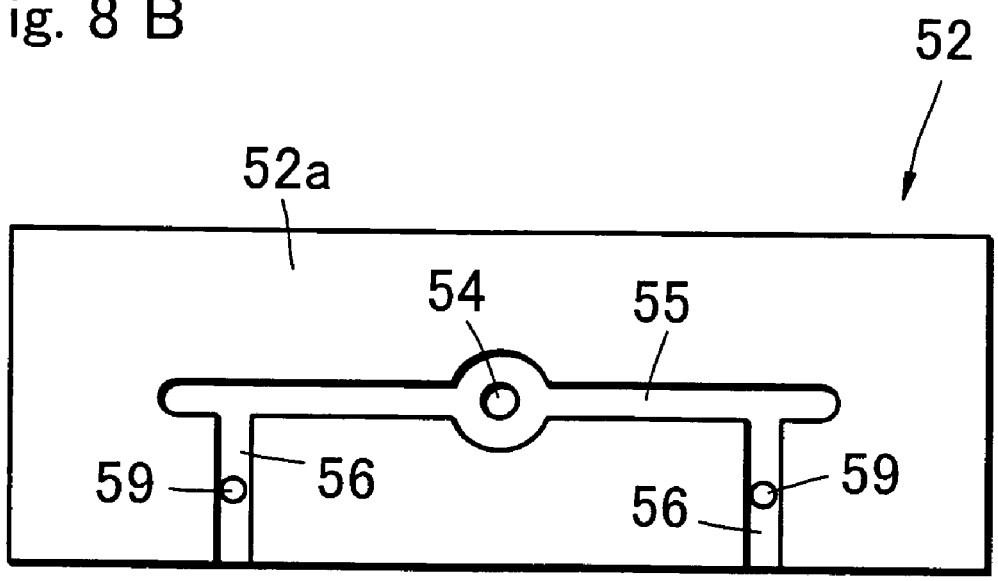

As shown in FIGS. 8A and 8B, insertion holes 59a are provided halfway of the runner 56 formed on the protrusion forming block 52, for ejector pins 59 to be inserted therein for taking out the two-sides IMD molded products 150. Each ejector pin 59 extends through an insertion hole 30 provided in the pocket of the die set 4, to be connected to a driving unit (not shown) installed in the die set 4. Upon activating such driving unit to project the ejector pins 59 out of the runner 56, the two-sides IMD products 150 are pressed outward from the second cavities 58, to be thereby taken out of the apparatus.

The structure of the die set 4 used with the fixed mold 2 is as follows. As shown in FIGS. 6A and 7, the die set 4 on the side of the fixed mold 2 includes a connecting member via which the fixed mold 2 is fixed to the fixed platen 122 of the two-sides IMD apparatus 120, and a fixed portion where the pocket 13 for receiving the insert 50 is provided. The connecting member includes a mechanism for driving the clamps 12 provided at the insert 50 and the ejector pins 59 and so on.

Figure 9:
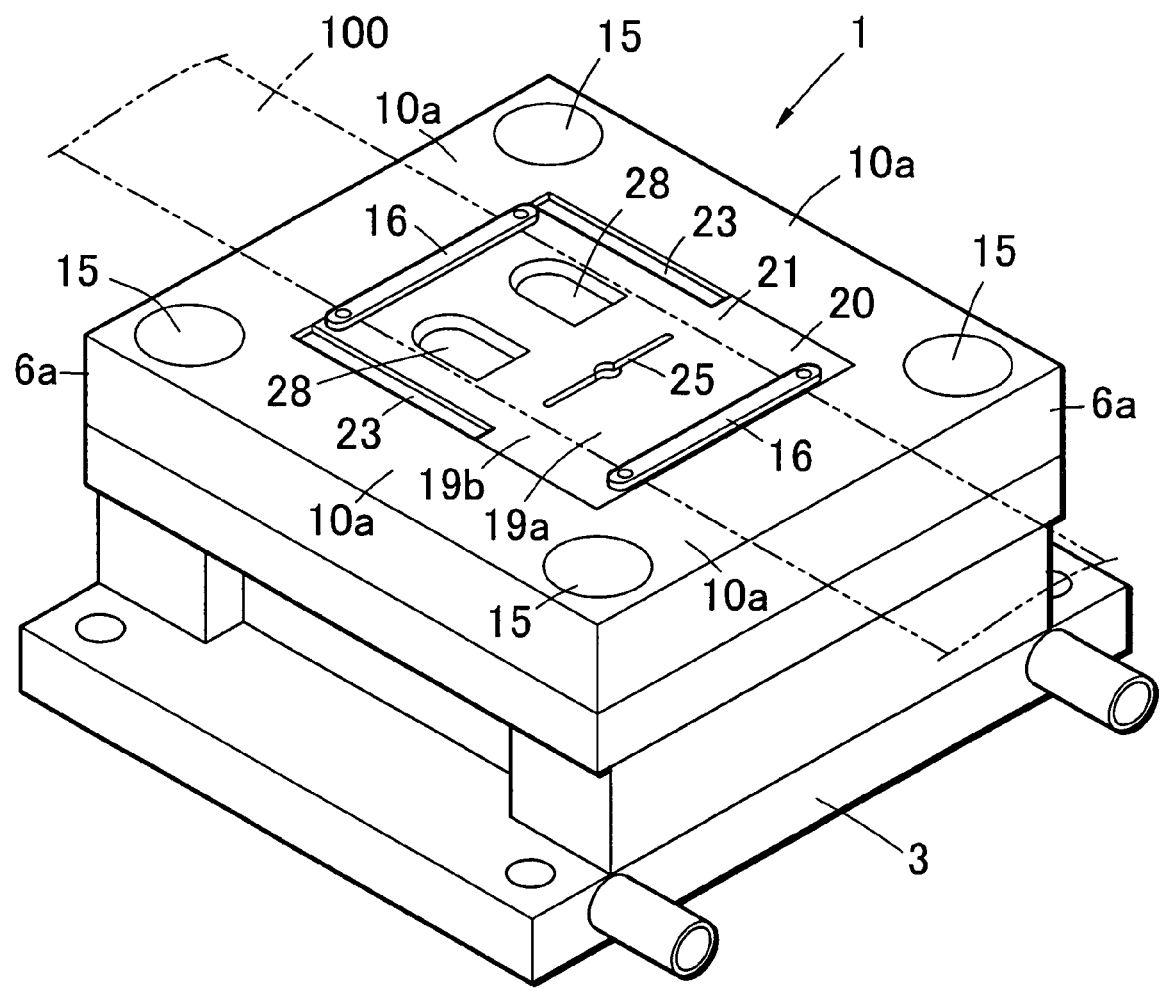
FIG. 9A is a perspective view showing a structure of the movable mold employed in the two-sides IMD molding die according to FIG. 5.
FIG. 9B is an exploded perspective view showing the movable mold according to FIG. 9A.
Figure 9:
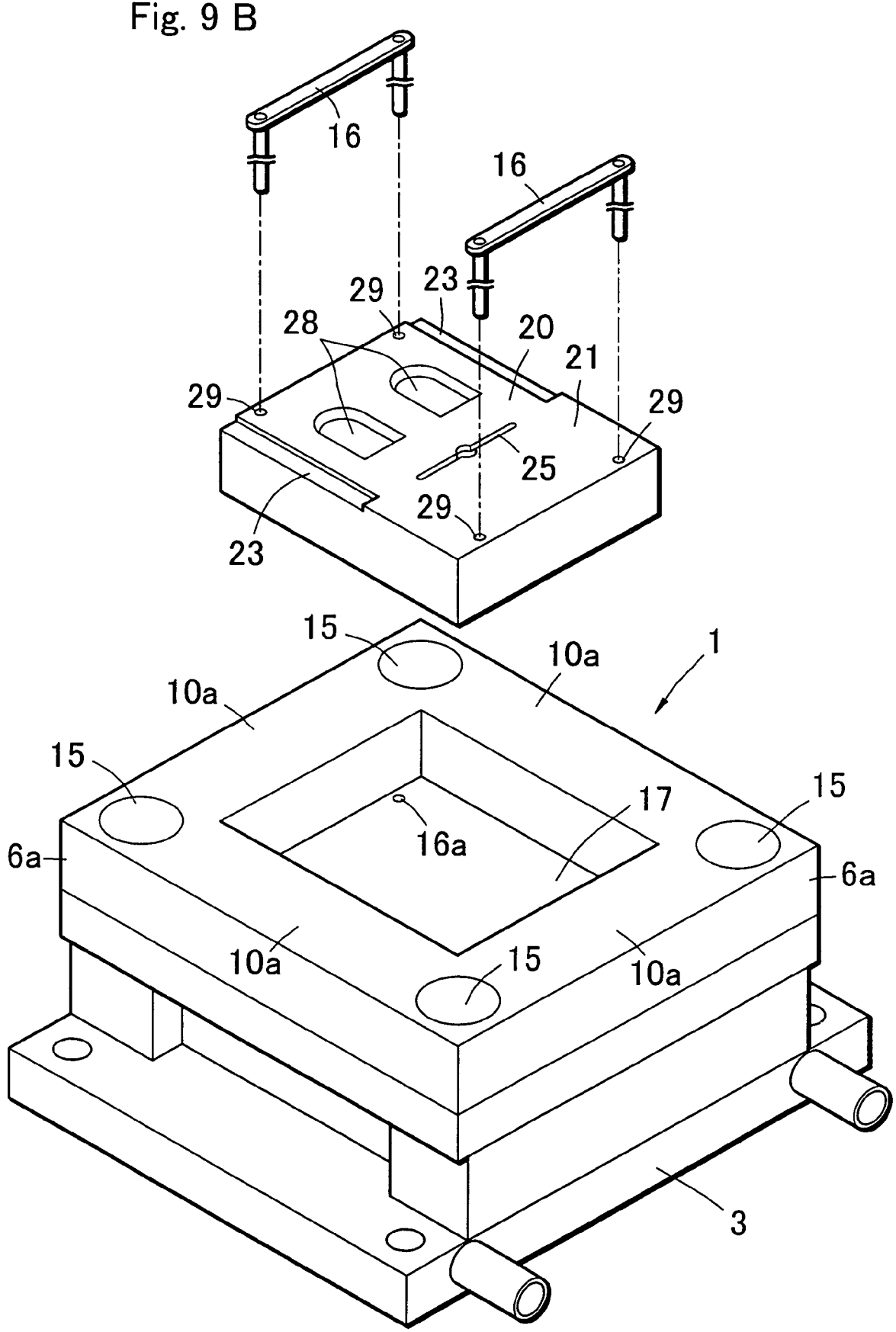

Now description will be given on the movable mold 1. As shown in FIGS. 9A and 9B, the movable mold 1 is provided with the insert 20 fixedly inserted in a pocket 17 formed in a recessed shape on the face of the movable die set 3 confronting the fixed mold 2. The insert 20 may be fixed, for example, with fixing screws (not shown). When fixing the insert with the fixing screws, it is preferable to provide screw holes on a face of a wall 6a surrounding the pocket 17 of the movable die set 3, not opposing the fixed mold 2. The wall 6a around the pocket 17 of the die set 3 of the movable mold 1 constitutes the clamping force supporting face 10a, which serves as the parting face that makes contact with the fixed mold 2 in the clamped state. The insert 20 is provided with two clamps 16 that serve to hold the first decoration film 100.

The insert 20 includes the first cavities 28 on its first cavity forming face 21 as will be later described, and the rear surface of the first cavity forming face 21 is formed in a smooth plane so as to fully contact with a mounting face inside the pocket 17 of the die set 3 when the insert 20 is mounted on the die set 3.

The die set 3 is provided with guide bushes 15 at the four corners of its parting face, into which the guide pins 11 of the fixed mold 2 are to be inserted when clamping the molds 1, 2, to maintain the same clamping position.

The clamps 16 serve to hold the first decoration film 100 so as to press it against the first cavity forming face 21 of the insert 20 as shown in FIG. 9B, and are oriented parallel to each other in a direction orthogonal to the longitudinal direction of the first decoration film 100. Each clamp 16 includes an elongated plate-shaped film holder and two legs projecting from portions close to the ends of the film holder, as shown in FIG. 9B. The legs are designed so as to penetrate clamp through holes 29 provided on the insert 20 and, once fixed to the die set 3, be inserted into clamp insertion holes 16a provided on the mounting face of the die set 3. The die set 3 is provided with a clamp moving mechanism 5a (See FIG. 5) to be connected to the legs of the clamps 16 inserted into the clamp insertion holes 16a, so as to move the clamps 16 up and down, and thus to alternately hold and release the first decoration film 100.

When the clamps 16 are lifted, the first decoration film 100 is released from the clamps 16 and hence is movable in a longitudinal direction thereof. When the clamps 16 are lowered, the first decoration film 100 is pressed by the clamps 16 against the first cavity forming face 21 of the insert 20, to be retained where it is. It is generally when the two molds 1, 2 are open and the first decoration film 100 is moved, that the clamps 16 are at the lifted positions, while it is when the first decoration film 100 is set in place and the molten resin is about to be injected, i.e. when the first decoration film 100 has to be retained in place, that the clamps 16 are at the lowered positions.

The insert 20 used with the movable mold 1 will now be described. As shown in FIGS. 9A and 9B, the insert 20 is of a flat plate shape, and a surface thereof is the first cavity forming face 21 where the cavities 28 are formed, and the opposite surface constitutes the mounting face when mounted on the die set 3. The first cavity forming face 21 is provided with a groove 25 to ensure that the molten resin injected with a high pressure through the sprue 54 on the fixed mold 2 is supplied between the two decoration films 100, 110. The groove 25 is located at a position that confronts with the runner 55 of the fixed mold 2 when the molds 1, 2 are clamped.

The first cavity forming face 21 of the insert 20 is also provided with cutaway portions 23 at a position confronting the clamps 12, to avoid interference with the clamps 12 of the fixed mold 2 when the movable mold 1 and the fixed mold 2 are clamped.

As shown in FIG. 9A, the first cavity forming face 21 of the movable mold 1 is configured to allow the first decoration film 100 to pass in a lengthwise direction, and a region where the first decoration film 100 passes is defined as a first decoration film passing region 19a. On the other hand, a region where the first decoration film 100 does not pass is defined as a first decoration film non-passing region 19b. The first cavities 28 have to be located in the first decoration film passing region 19a.

The insert 20 is also provided with the clamp through holes 29 at the corner regions as stated above, into which the clamp legs are to be inserted respectively. In addition, the insert 20 is provided with suction holes (not shown) on its rear surface (mounting face) communicating with the first cavity forming face 21, through which the first decoration film 100 is sucked toward the first cavity forming face 21 of the insert 20 when mounted on the die set 3, as will be described later.

The structure of the die set 3 used with the movable mold 1 is as follows. As shown in FIGS. 9A and 9B, the die set 3 on the side of the movable mold 1 includes a connecting member via which the movable mold 1 is fixed to the movable platen 121 of the two-sides IMD apparatus 120, and a fixed portion where the pocket 17 for receiving the insert 20 is formed. The connecting member includes a mechanism for driving the clamps 16 provided at the insert 20.

Figure 10:
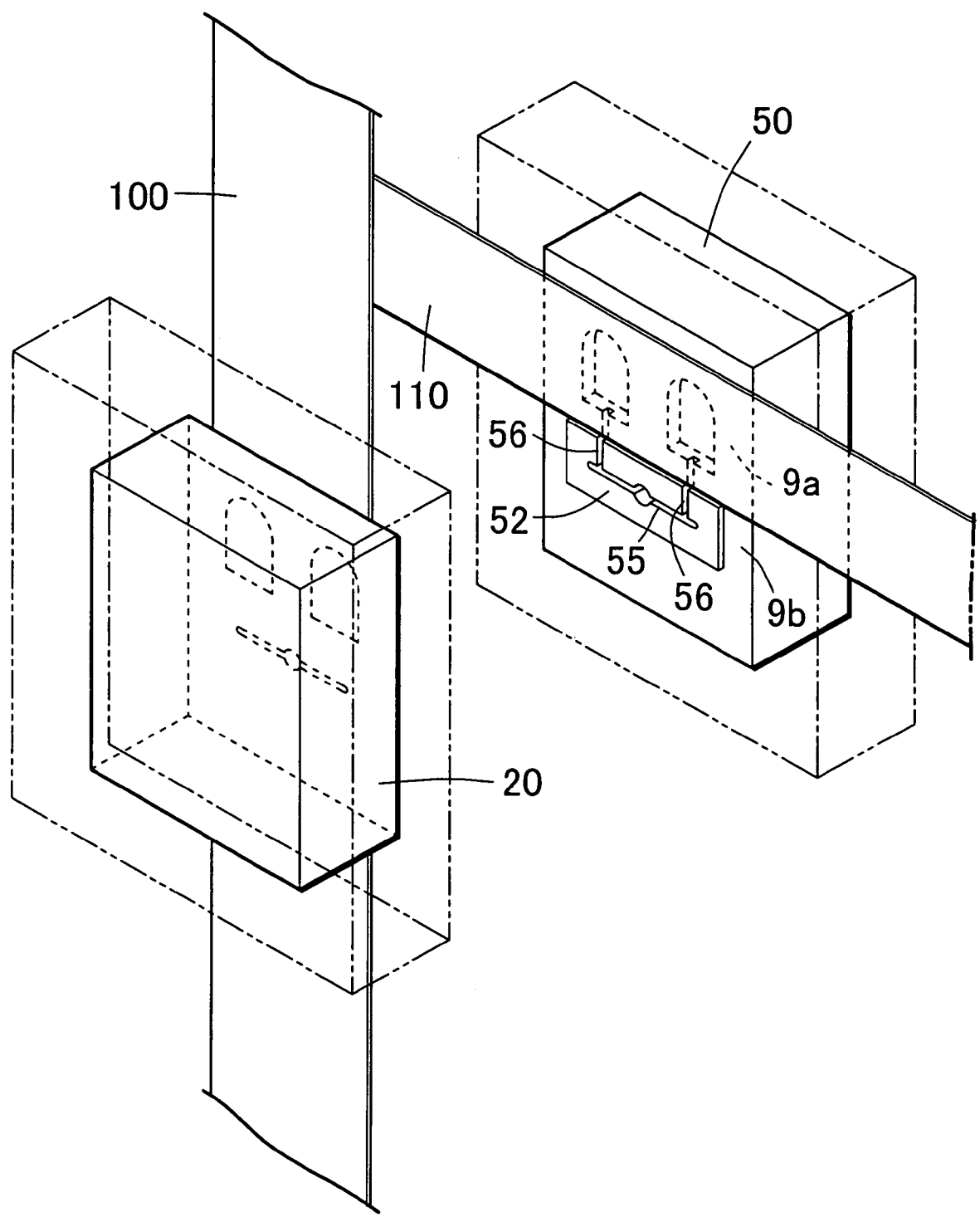
FIG. 10 is a schematic perspective view showing a positional relationship between the first and the second decoration films and the two-sides IMD molding die according to FIG. 5.

Now, a method of manufacturing a two-sides IMD molded product utilizing the molds 1, 2 according to this embodiment will be described hereunder. FIG. 10 is a schematic perspective view showing a positional relationship between the first and the second decoration films 100, 110 and the two-sides IMD molding die according to FIG. 5. Although only the inserts 20, 50 of the respective molds 1, 2 are shown in FIG. 10 for explicitness sake, it is a matter of course that actually the inserts 20, 50 are fixed to the die set 3, 4 and then mounted on the two-sides IMD apparatus 120.

In the molding die according to this embodiment, the movable mold 1 on which the first decoration film 100 is lengthwise movably disposed, and the fixed mold 2 on which the second decoration film 110 is laterally movably disposed are oriented such that the cavity forming faces 21, 51 of the respective inserts 20, 50 confront each other.

When the movable mold 1 moves toward the fixed mold 2, the clamping force supporting faces 10a, 10b of the die sets 3, 4 come into contact with each other, thus to enter the clamped state. In the clamped state, a clearance L is defined between the first decoration film 100 of the movable mold 1 and the second decoration film 110 of the fixed mold 2, in a region where the inserts 20, 50 are confronting (See FIG. 11). According to this embodiment, the cavity forming faces 21, 51 of the inserts 20, 50 are located slightly lower than the parting faces, that is, the clamping force supporting faces 10a, 10b at the walls 6a, 6b of the die sets 3, 4 of the molds 1, 2, as a result of which the clearance L is created when the two molds 1, 2 are clamped.

A width of the clearance L may be a value that can keep the clamping force of the molds 1, 2 from being applied to the first and the second decoration films 110, 110. For example, the value L may be substantially the same as a total thickness of the first and second decoration films 100, 110 in an overlapping state.

Figure 11:
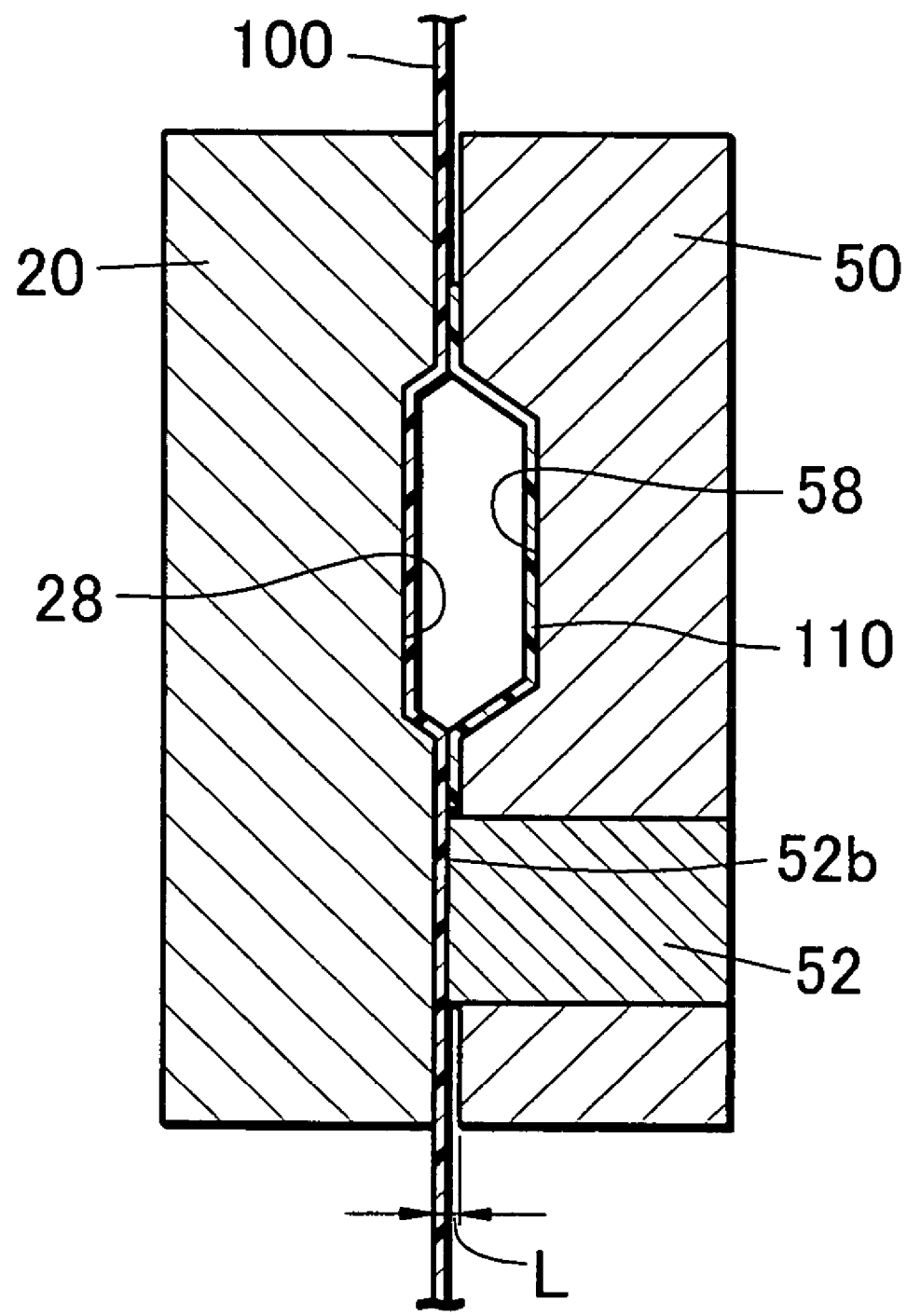
FIG. 11 is a cross-sectional side view taken along the line XI-XI in FIG. 8C, showing the two-sides IMD molding die according to FIG. 5 in a clamped state.

Likewise, a height of the protruding section 52a located on the second cavity forming face 51 of the fixed mold 2 is set to be substantially the same as the thickness of the second decoration film 110 disposed on the fixed mold 2. Accordingly, when the molds are clamped, a gap is barely created between the first decoration film 100 disposed on the movable mold 1 and an upper surface 52b of the protruding section 52a of the fixed mold 2 (Ref. FIG. 11).

Figure 12:
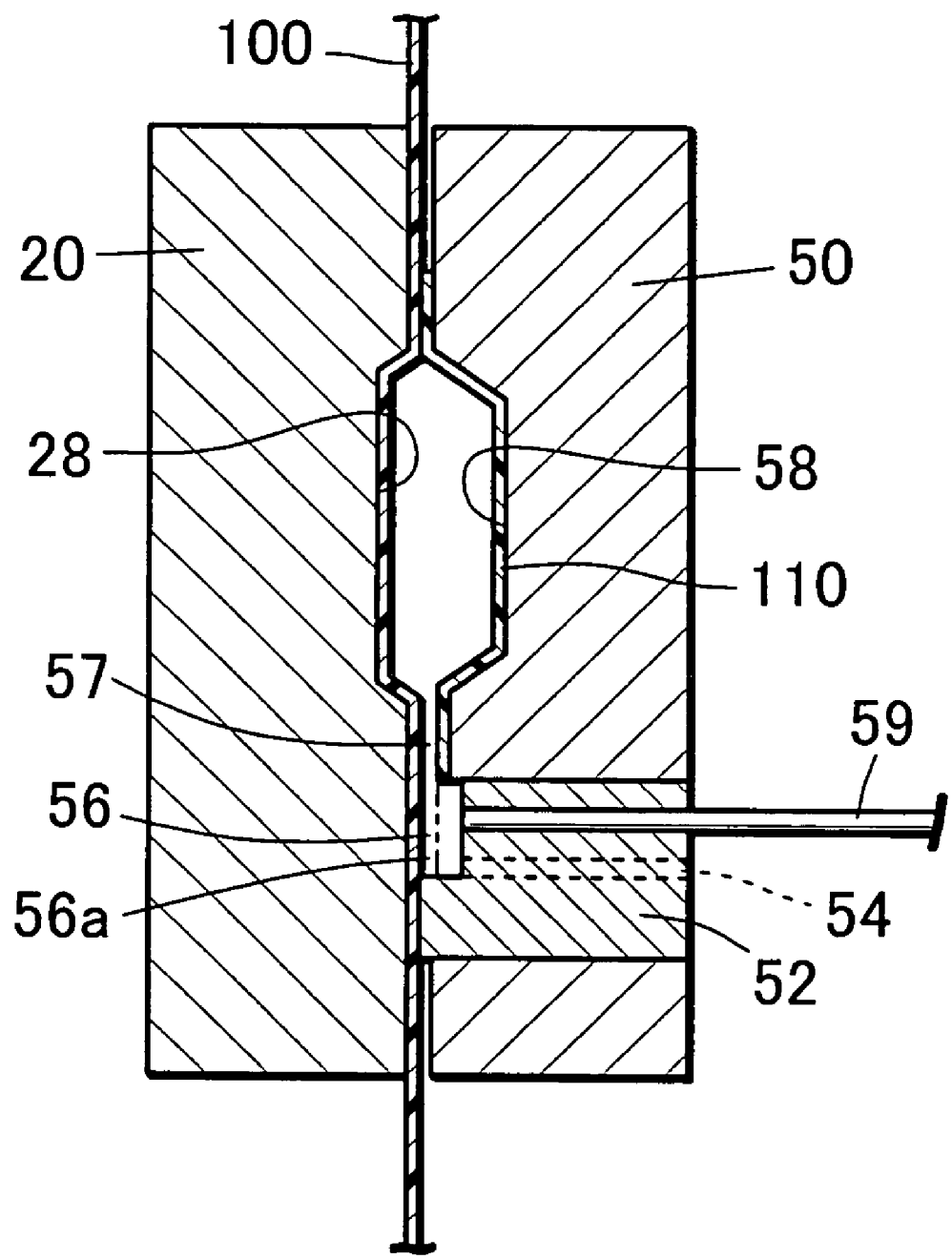
FIG. 12 is a cross-sectional side view taken along the line XII-XII in FIG. 8C, showing the two-sides IMD molding die according to FIG. 5 in a clamped state.
Figure 13:
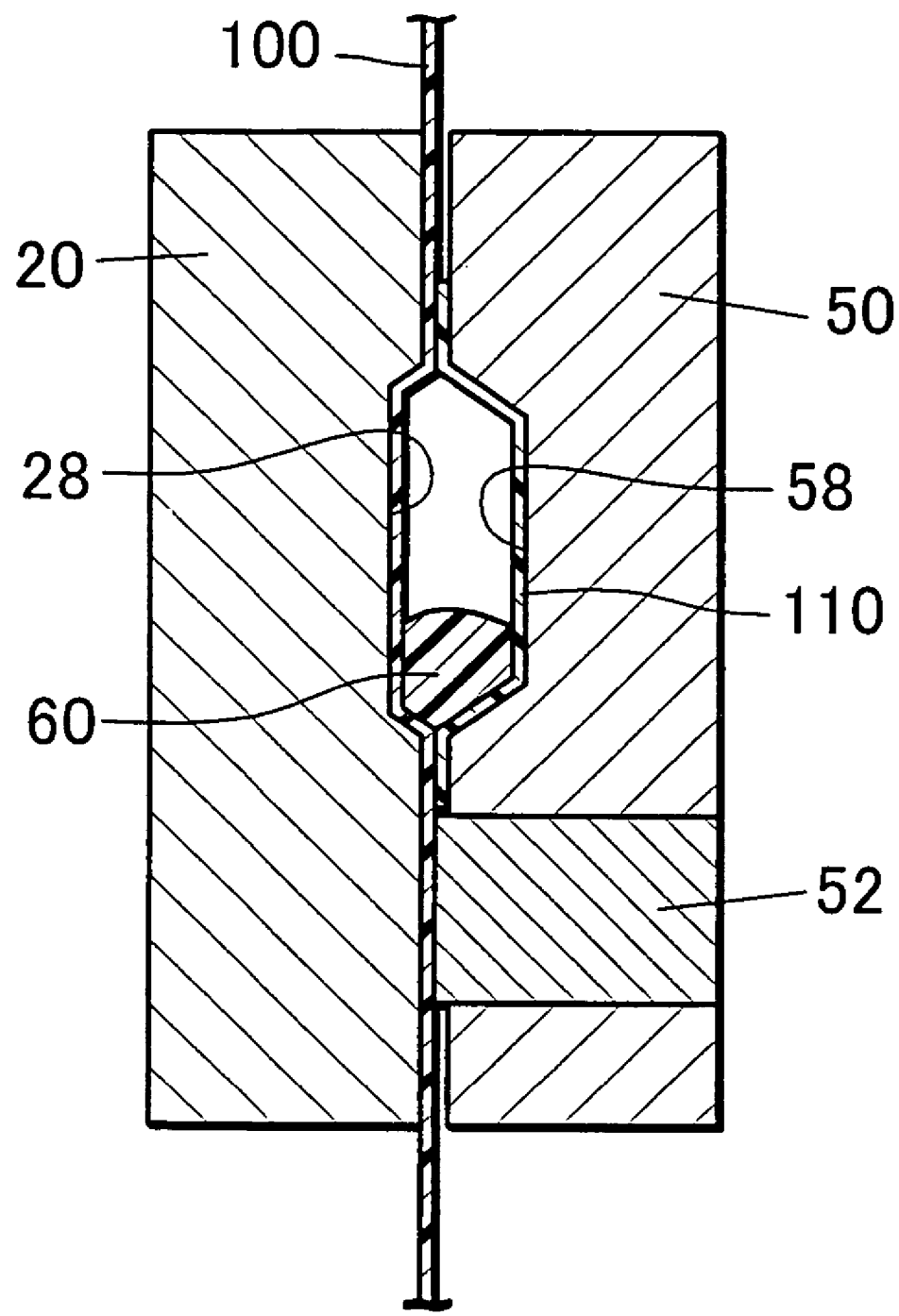
FIG. 13 is a cross-sectional side view of the two-sides IMD molding die according to FIG. 11, showing a state where a molten resin is being injected.
Figure 14:
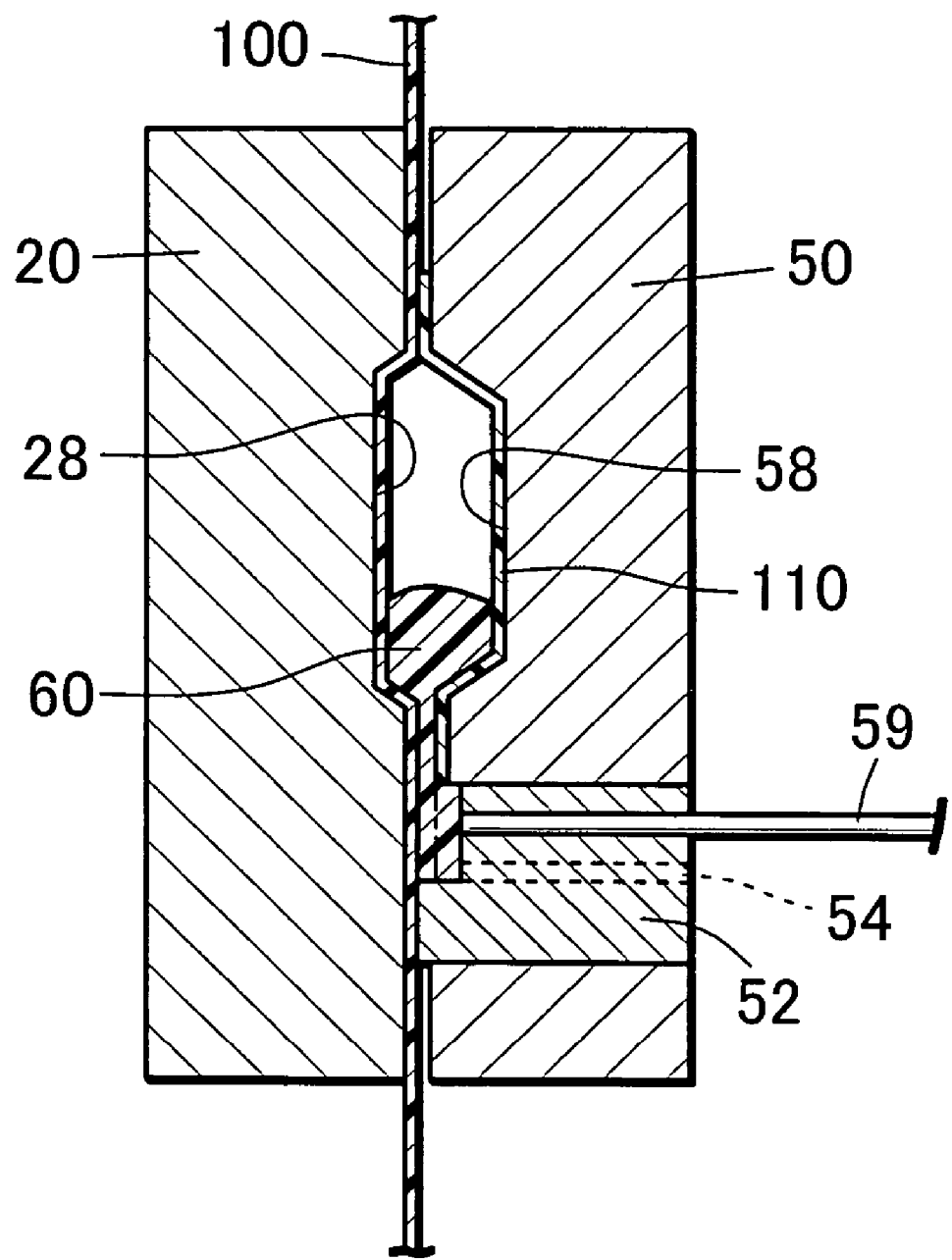
FIG. 14 is a cross-sectional side view of the two-sides IMD molding die according to FIG. 12, showing a state where a molten resin is being injected.

As shown in FIGS. 12 and 14, since the runners 55, 56 are provided on the protruding section 52a of the fixed molds, the molten resin injected through the sprue 54 is supplied into the cavities 28, 58 through the molten resin moving path 56a enclosed by the first decoration film 100 and the runners 55, 56. However upon entering the runner 57, the molten resin passes through between the first and the second decoration films 100, 110, thus to reach the cavities 28, 58. At this stage, since the surface of the protruding section 52a is in contact with the first decoration film 100 without a gap therebetween as stated above, the molten resin does not leak out of the molten resin moving path 56a as shown in FIG. 13. Therefore, a resin flash is not formed around the runner 55, 56.

Figure 15:
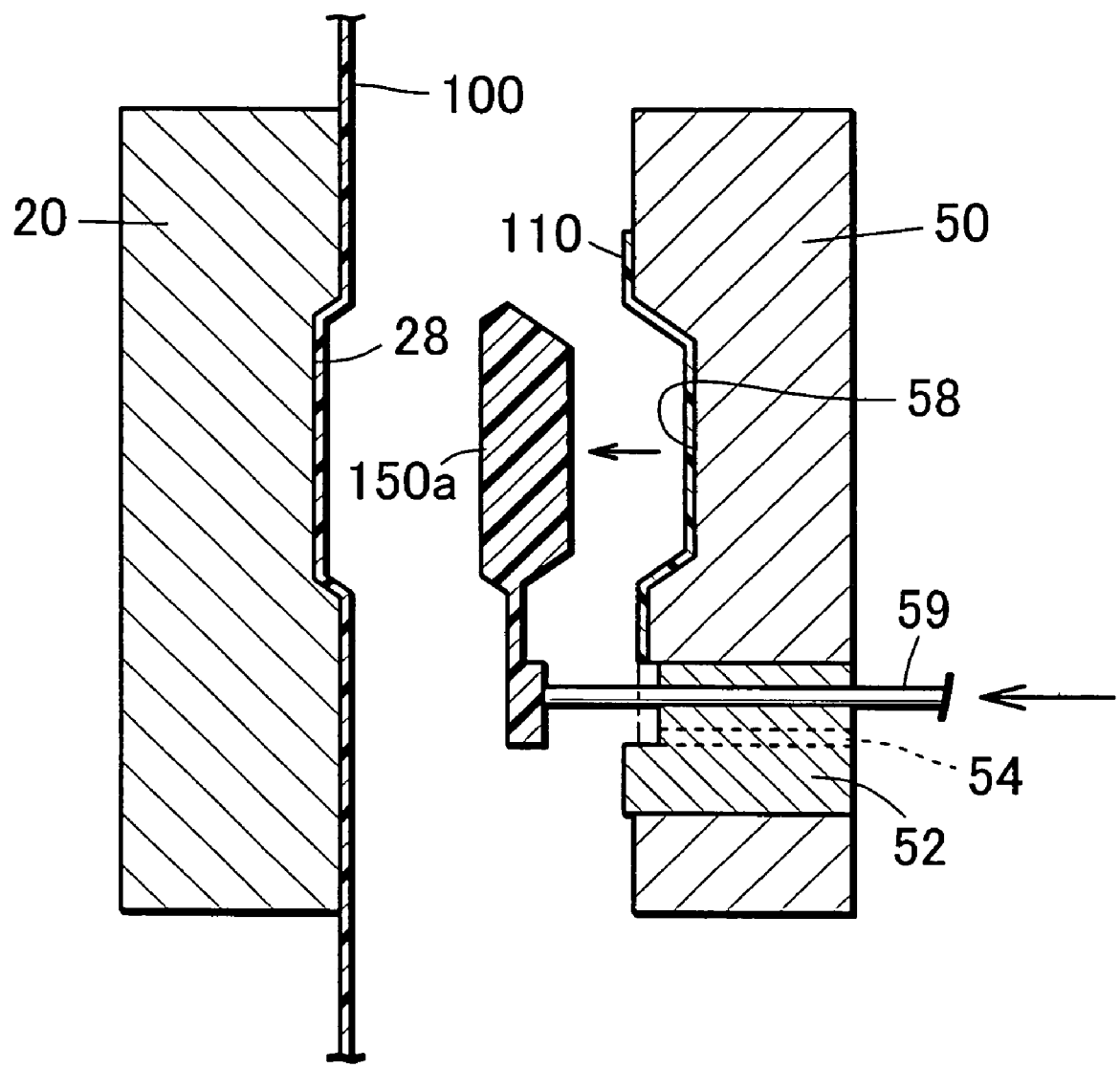
FIG. 15 is a cross-sectional side view of the two-sides IMD molding die according to FIG. 12, in an opened state where a molded product is being taken out.

As shown in FIG. 15, when the molten resin 60 filled inside the cavities 28, 58 has solidified by cooling, the movable mold 1 is separated from the fixed mold 2 thus to enter an opened state. Thereafter, the molded product 150a is released from the fixed mold 2. For doing this, the driving unit installed in the die set 4 of the fixed mold 2 is activated, to thereby project the ejector pins 59 outward so as to release the molded product 150a, so that the molded product 150a can be taken out. The released molded product 150a is subjected to a cutting process to remove the portion corresponding to the runners, and thus the two-sides IMD molded products 150 provided with a decoration on both sides thereof is obtained.

Figure 16:
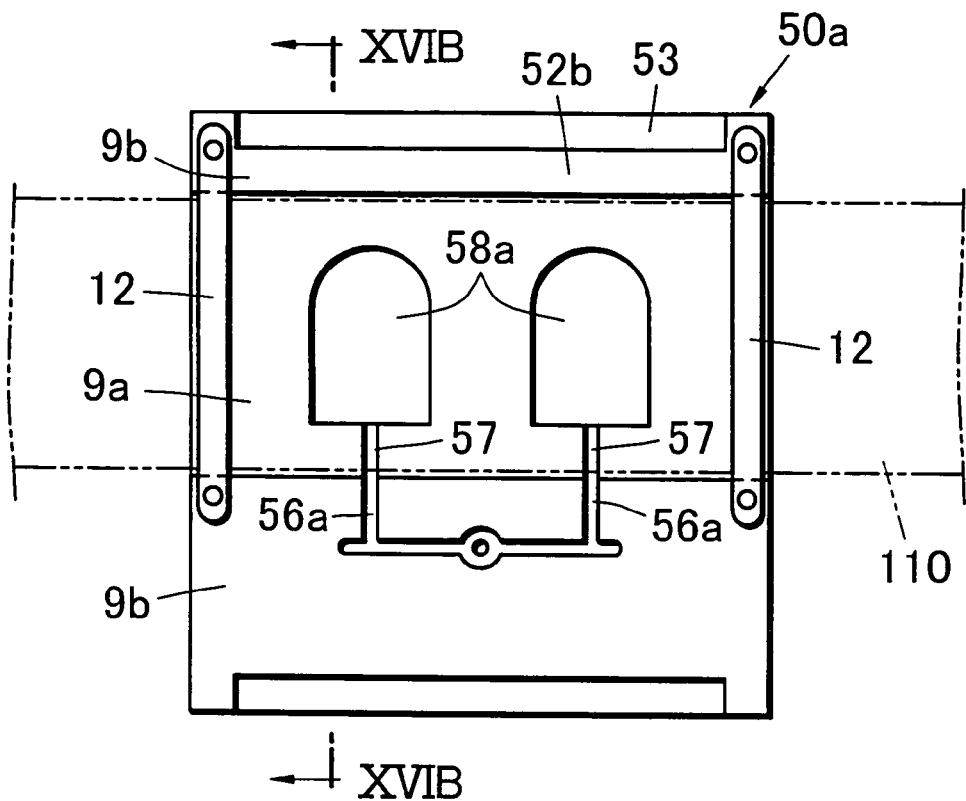
FIG. 16A is a plan view showing a structure of an insert of a fixed mold employed in a two-sides IMD molding die according to a second embodiment of the present invention.
FIG. 16B is a cross-sectional side view taken along the line XVIB-XVIB in FIG. 16A, showing a state where the decoration films are disposed on the two-sides IMD molding die according to the second embodiment.
Figure 16:
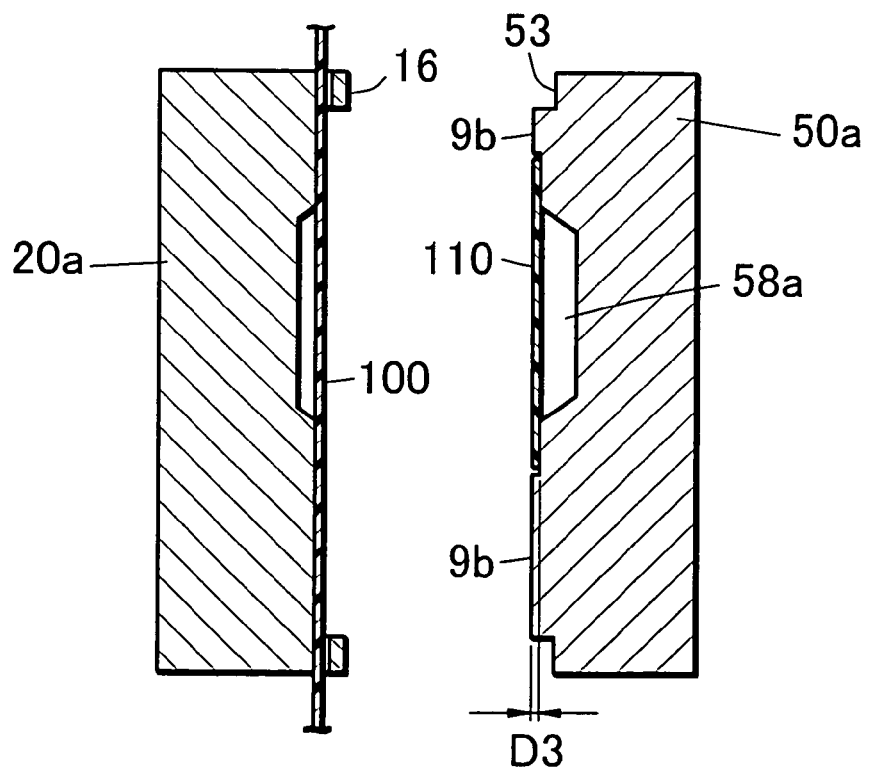
Figure 17:
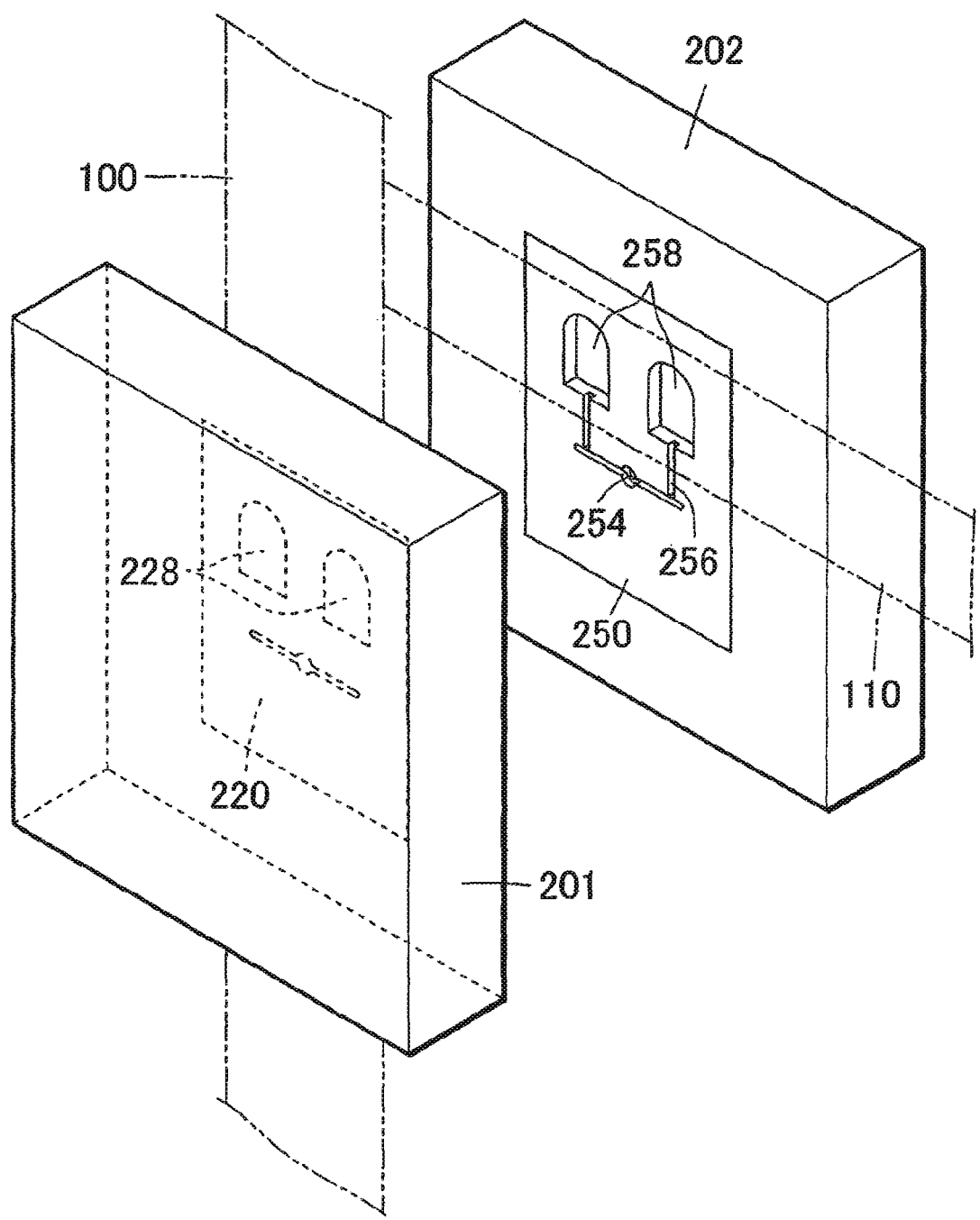
FIG. 17 is a schematic perspective view showing a structure of a conventional two-sides IMD molding die.
Figure 18:
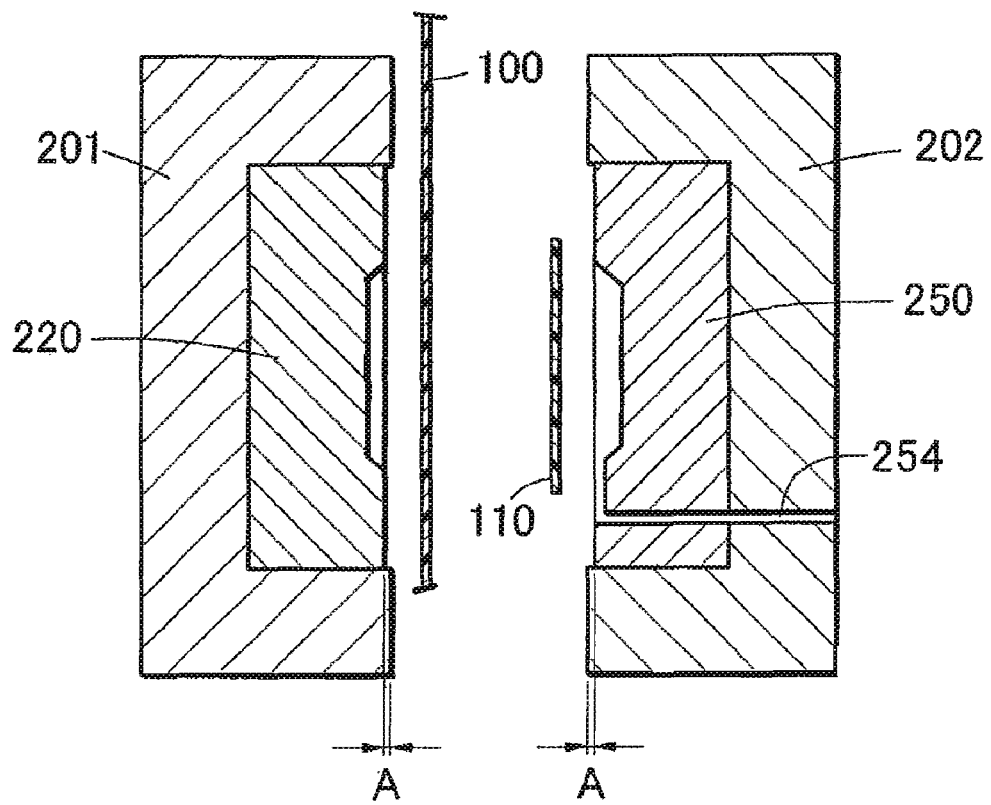
FIG. 18A is a schematic cross-sectional side view showing the two-sides IMD molding die according to FIG. 17 in an opened state.
FIG. 18B is a schematic cross-sectional side view showing the two-sides IMD molding die according to FIG. 17 in a clamped state.
Figure 18:
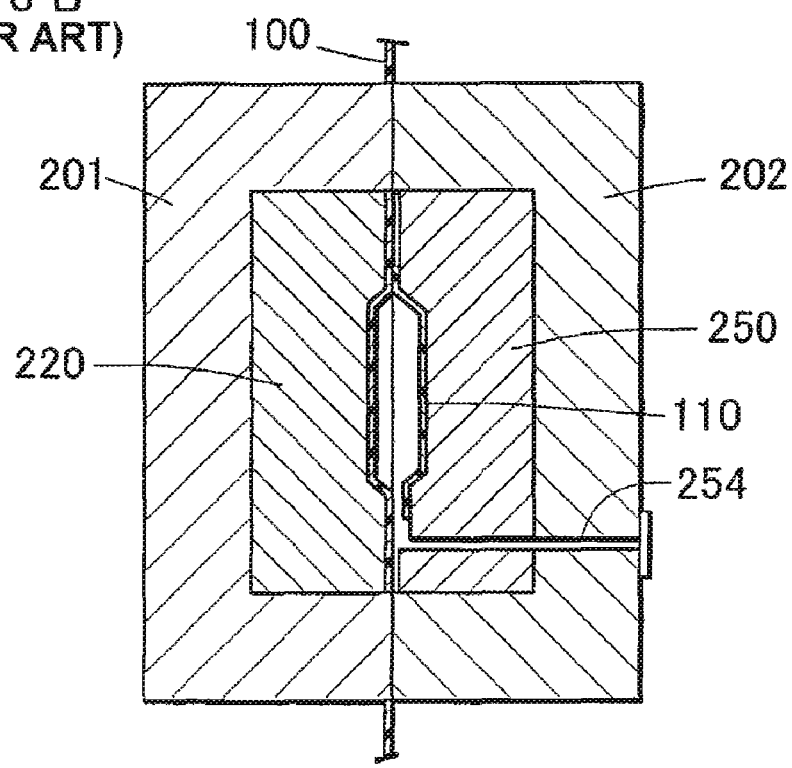
Figure 19:
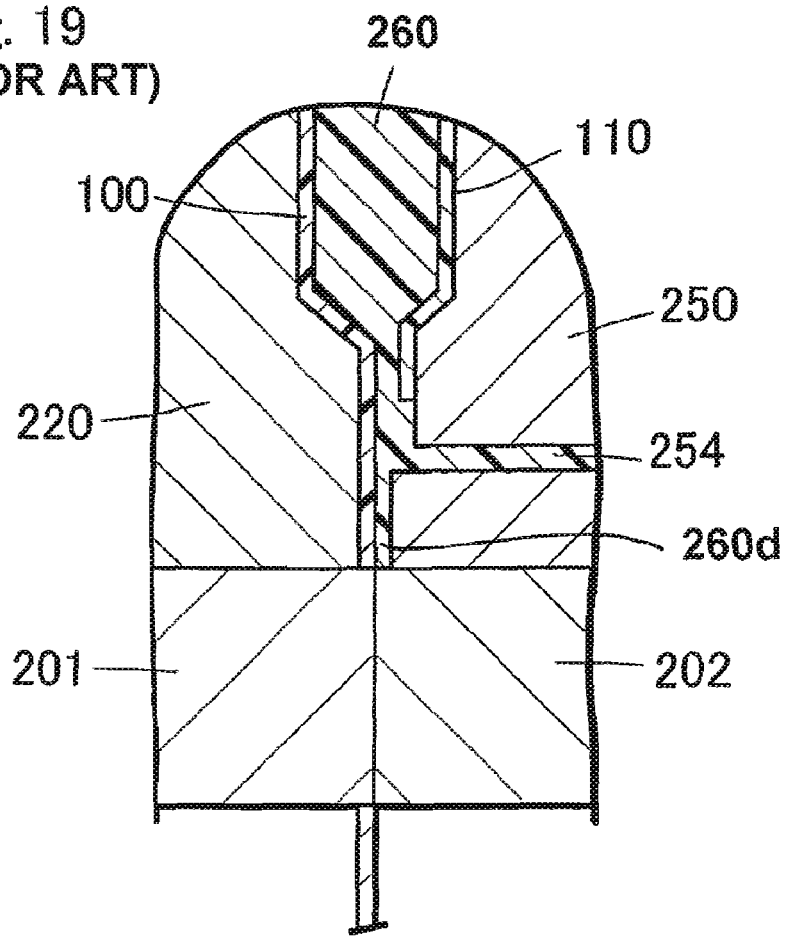
FIG. 19 is an enlarged fragmentary cross-sectional view taken from FIG. 18B.
Figure 20:
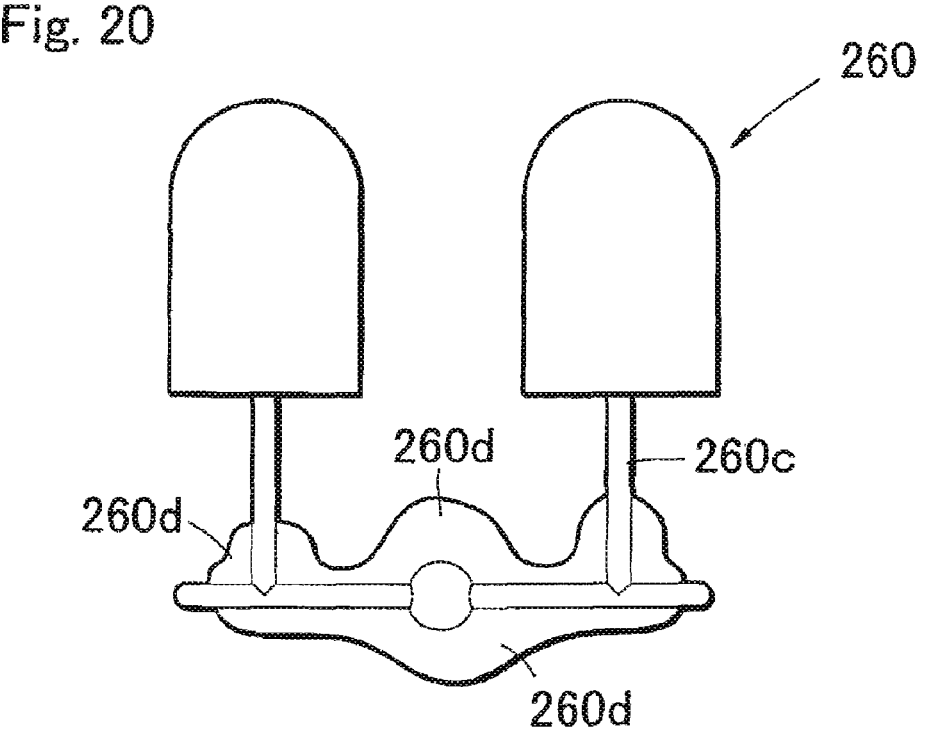
FIG. 20 is a schematic front view showing a molded product formed by the two-sides IMD molding die according to FIG. 17.

FIGS. 16A and 16B are views showing a structure of an insert of a fixed mold employed in a two-sides IMD molding die according to another embodiment of the present invention. The insert 50a of the fixed mold according to this embodiment is basically of the same structure as that of the first embodiment, except that a protruding section 52b integrally formed with the insert 50a is provided substantially all over the second decoration film non-passing region 9b, i.e. the region except the second decoration film passing region 9a where the second decoration film 110 passes through. Such structure can be achieved through forming the protruding section 52b by polishing the area corresponding to the second decoration film passing region 9a of the insert 50a, forming the cavities 58a in the polished region and providing the runners 56a, 57. Accordingly, the insert 50a can be produced through a simplified process.

The present invention is not limited to the foregoing embodiments, but can be embodied in various other forms. To cite a few examples, while the sprue through which the molten resin is injected is disposed on the side of the fixed mold according to the embodiments, the sprue may be provided on the side of the movable mold.

Further, without limitation to the structure wherein the insert is fitted in the pocket formed on the die set, any other structure may be employed as long as a gap that allows the decoration film to pass therethrough is provided between the cavity forming faces of the molds 1, 2, when the molds 1, 2 are clamped.

Further, any feature of the foregoing embodiments may be combined as desired, so as to obtain the advantageous effect of the respective feature.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A two-sides in-mold decoration molding die, comprising:
    a first mold comprised of a first cavity located on a first cavity forming face, on which a first decoration film is movably disposed in a first direction, parallel to the first cavity forming face, so as to pass over the first cavity, wherein the first decoration film has a width that covers the first cavity, but is smaller than the first cavity forming face; and
    a second mold comprised of a second cavity, located in a second decoration film passing region of a second cavity forming face, on which a second decoration film is movably disposed in a second direction intersecting the first direction, parallel to the second cavity forming face, so as to pass over the second cavity of the second decoration film passing region, the second mold further comprising a protruding section, protruded from a surface of a second decoration film non-passing region of the second cavity forming face, with a runner through which to supply molten resin injected through a sprue to the second cavity, wherein, said second mold is placed so as to oppose the first mold and movable with respect to the first mold so as to be clamped and separated from the first mold, the second decoration film has a width that covers the second cavity, but is smaller than the second cavity forming face, and the second decoration film passing region is different from the second decoration film non-passing region,
    wherein when clamping the first mold and the second mold, an upper surface of the protruding section and a region of the first decoration film, where the first decoration film does not overlap the second decoration film, contact each other, so as to define, in the runner, a molten resin path for guiding the molten resin to pass between the first decoration film and the second decoration film, preventing the molten resin from leaking, and
    the molten resin is injected into the first cavity and the second cavity to produce a molded product to which the first decoration film and the second decoration film are integrally adhered.

2. The two-sides in-mold decoration molding die according to claim 1, wherein a height of the protruding section located in the second decoration film non-passing region of the second cavity forming face is substantially the same as a thickness of the second decoration film.

3. The two-sides in-mold decoration molding die according to claim 1, wherein the protruding section is defined by an insertion hole formed in the second decoration film non-passing region of the second cavity forming face, and a protrusion forming block to be inserted in the insertion hole; and
    the protrusion forming block, provided with the runner on an upper surface, is inserted in the insertion hole with an uppermost portion of the protrusion forming block protruding outside to constitute the protruding section.

4. The two-sides in-mold decoration molding die according to claim 1, wherein the first and the second molds are respectively provided with inserts oriented such that opposing faces of the inserts constitute the first and the second cavity forming faces when the molds are clamped, and die sets for holding the inserts in the molds such that faces of the die sets on the respective molds serve as clamping force supporting portions.

5. The two-sides in-mold decoration molding die according to claim 4, wherein the first and the second molds are formed such that the first and the second cavity forming faces of the inserts are recessed with respect to the clamping force supporting portions of the die sets.

6. A method of manufacturing a two-sides in-mold decoration molded product utilizing a molding die including a first mold and a second mold having a first cavity forming face and a second cavity forming face, respectively, the first cavity forming face and the second cavity forming face being provided with a first cavity and a second cavity, respectively, the method comprising:
    disposing a first decoration film on the first mold so as to move in a first direction, parallel to the first cavity forming face where the first cavity is provided, while passing over the first cavity, wherein the first decoration film has a width that covers the first cavity, but is smaller than the first cavity forming face;
    disposing a second decoration film on the second mold so as to move in a second direction intersecting the first direction and parallel to the second cavity forming face while passing over the second cavity, located in a second decoration film passing region, such that the second decoration film does not overlap a protruding section, protruded from a surface of a second decoration film non-passing region of the second cavity forming face, with a runner through which to supply a molten resin injected through a sprue to the second cavity at a position corresponding to a portion of a second decoration film non-passing region of the second cavity forming face of the second mold, wherein the second decoration film has a width that covers the second cavity, but is smaller than the second cavity forming face, and the second decoration film passing region is different from the second decoration film non-passing region;

clamping the first mold and the second mold with the two decoration films held-between the first mold and the second mold, such that an upper surface of the protruding section and a region of the first decoration film, where the first decoration film does not overlap the second decoration film, contact each other, so as to define, in the runner, a molten resin path for guiding the molten resin to pass between the first decoration film and the second decoration film, preventing the molten resin from leaking; and injecting the molten resin, via the runner, into the first cavity and the second cavity so as to form a resin molded product and integrally adhere the first decoration film and the second decoration film to a surface of the resin molded product.

7. The method according to claim 6, further comprising:
setting a height of the protruding section located in the second decoration film non-passing region of the second cavity forming face to be substantially the same as a thickness of the second decoration film.

8. The two-sides in-mold decoration molding die according to claim 2, wherein the protruding section is defined by an insertion hole formed in the second decoration film non-passing region of the second cavity forming face, and a protrusion forming block to be inserted in the insertion hole; and
the protrusion forming block, provided with the runner on an upper surface, is inserted in the insertion hole with an uppermost portion of the protrusion forming block protruding outside to constitute the protruding section.

9. The two-sides in-mold decoration molding die according to claim 2, wherein when the first and second molds are clamped, a clearance substantially the same as the thickness of the second decoration film exists between the region of the first decoration film, where the first decoration film does not overlap the second decoration film, and a region not including the protruding section in the second decoration film non-passing region of the second cavity forming face.

* * * * *